(12) United States Patent
Gusmorino et al.

(10) Patent No.: US 7,188,316 B2
(45) Date of Patent: Mar. 6, 2007

(54) SYSTEM AND METHOD FOR VIEWING AND EDITING MULTI-VALUE PROPERTIES

(75) Inventors: Paul A. Gusmorino, Seattle, WA (US); Ben Karas, Bellevue, WA (US); David G. De Vorchik, Seattle, WA (US); Marcus Harvey, Seattle, WA (US); Patrice L. Miner, Kirkland, WA (US); Tyler K. Beam, Redmond, WA (US); Timothy P. McKee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/111,968

(22) Filed: Apr. 22, 2005

(65) Prior Publication Data

US 2005/0251748 A1   Nov. 10, 2005

Related U.S. Application Data

(63) Continuation-in-part of application No. 10/395,533, filed on Mar. 24, 2003, which is a continuation-in-part of application No. 10/395,560, filed on Mar. 24, 2003.

(51) Int. Cl.
 G06F 3/00 (2006.01)
 G06F 3/01 (2006.01)
(52) U.S. Cl. .................................... 715/764
(58) Field of Classification Search ............ 713/2; 715/738, 764
 See application file for complete search history.

(56) References Cited

U.S. PATENT DOCUMENTS 5,241,671 A   8/1993  Reed et al.
5,333,315 A   7/1994  Saether et al.
5,388,196 A   2/1995  Pajak et al.
5,499,364 A   3/1996  Klein et al.
5,504,852 A   4/1996  Thompson-Rohrlich (Continued)

FOREIGN PATENT DOCUMENTS

| CN | 1421800 | 11/2001 |
| GB | 2329492 | 3/1999 |
| WO | WO 0225420 | 3/2002 |
| WO | WO2004107151 | 9/2004 |

OTHER PUBLICATIONS

Adobe Inc. et al. "Adobe Photoshop CS Classroom in a book" Dec. 1, 2003 1-29.*

(Continued)

*Primary Examiner*—Weilun Lo
*Assistant Examiner*—Steven Theriault
(74) *Attorney, Agent, or Firm*—Banner & Witcoff, Ltd.

(57) ABSTRACT

In a display of properties (or metadata) for multiple selected files, properties may be aggregated. Visual differentiation may be used to associate displayed aggregated values with one or more selected files to which the values pertain. Multi-value properties may also be aggregated and differentiated and/or accentuated. When aggregating multiple multi-value properties, steps may be taken to carry relative priority or positioning assigned by each of the selected files to which the multi-value properties pertain. Aggregated multi-value properties may include prompt text informing them of editing options, and users may edit properties by editing the displayed aggregated properties. Changes to the aggregated properties may be applied to the properties of the various selected files.

19 Claims, 32 Drawing Sheets

U.S. PATENT DOCUMENTS

| | | | |
|---|---|---|---|
| 5,513,306 A * | 4/1996 | Mills et al. ................. 715/530 |
| 5,630,042 A * | 5/1997 | McIntosh et al. ........... 715/744 |
| 5,680,563 A | 10/1997 | Edelman |
| 5,696,486 A | 12/1997 | Poliquin et al. |
| 5,757,925 A | 5/1998 | Faybishenko |
| 5,802,516 A | 9/1998 | Shwarts et al. |
| 5,831,606 A | 11/1998 | Nakajima et al. |
| 5,835,094 A | 11/1998 | Ermel et al. |
| 5,838,317 A | 11/1998 | Bolnick et al. |
| 5,838,322 A * | 11/1998 | Nakajima et al. ........... 715/846 |
| 5,875,446 A | 2/1999 | Brown et al. |
| 5,878,410 A | 3/1999 | Zbikowski et al. |
| 5,899,995 A | 5/1999 | Millier et al. |
| 5,933,139 A | 8/1999 | Feigner et al. |
| 5,987,454 A | 11/1999 | Hobbs |
| 5,987,506 A | 11/1999 | Carter et al. |
| 6,003,040 A | 12/1999 | Mital et al. |
| 6,008,806 A * | 12/1999 | Nakajima et al. ........... 715/744 |
| 6,014,137 A | 1/2000 | Burns |
| 6,021,262 A | 2/2000 | Cote et al. |
| 6,025,843 A | 2/2000 | Sklar |
| 6,037,944 A | 3/2000 | Hugh |
| 6,061,692 A | 5/2000 | Thomas et al. |
| 6,061,695 A | 5/2000 | Slivka et al. |
| 6,078,924 A | 6/2000 | Ainsbury et al. |
| 6,097,389 A * | 8/2000 | Morris et al. ................ 715/804 |
| 6,147,601 A | 11/2000 | Sandelman et al. |
| 6,181,342 B1 * | 1/2001 | Niblack ....................... 345/635 |
| 6,237,011 B1 | 5/2001 | Ferguson et al. |
| 6,240,421 B1 | 5/2001 | Stolarz |
| 6,243,094 B1 | 6/2001 | Sklar |
| 6,243,724 B1 | 6/2001 | Mander et al. |
| 6,256,031 B1 | 7/2001 | Meijer et al. |
| 6,275,829 B1 | 8/2001 | Angiulo et al. |
| 6,317,142 B1 * | 11/2001 | Decoste et al. ............. 715/762 |
| 6,324,551 B1 | 11/2001 | Lamping et al. |
| 6,339,767 B1 | 1/2002 | Rivette et al. |
| 6,341,280 B1 * | 1/2002 | Glass et al. ..................... 707/3 |
| 6,363,377 B1 | 3/2002 | Kravets et al. |
| 6,401,097 B1 | 6/2002 | McCotter et al. |
| 6,411,311 B1 | 6/2002 | Rich et al. |
| 6,430,575 B1 | 8/2002 | Dourish et al. |
| 6,430,835 B1 | 8/2002 | Ranucci et al. |
| 6,453,311 B1 | 9/2002 | Powers, III |
| 6,466,238 B1 | 10/2002 | Berry et al. |
| 6,480,835 B1 | 11/2002 | Light |
| 6,505,233 B1 | 1/2003 | Hanson et al. |
| 6,513,038 B1 | 1/2003 | Hasegawa et al. |
| 6,526,399 B1 * | 2/2003 | Coulson et al. ................. 707/1 |
| 6,535,229 B1 | 3/2003 | Kraft |
| 6,539,399 B1 | 3/2003 | Hazama et al. |
| 6,549,916 B1 | 4/2003 | Sedlar |
| 6,573,907 B1 | 6/2003 | Madrane |
| 6,583,799 B1 * | 6/2003 | Manolis et al. ............. 715/838 |
| 6,590,585 B1 * | 7/2003 | Suzuki et al. ............... 715/719 |
| 6,613,101 B2 * | 9/2003 | Mander et al. .............. 715/526 |
| 6,636,238 B1 | 10/2003 | Amir et al. |
| 6,636,250 B1 | 10/2003 | Gasser |
| 6,684,222 B1 | 1/2004 | Cornelius et al. |
| 6,738,770 B2 | 5/2004 | Gorman |
| 6,745,206 B2 * | 6/2004 | Mandler et al. ......... 707/104.1 |
| 6,754,829 B1 | 6/2004 | Butt et al. |
| 6,762,776 B2 | 7/2004 | Huapaya |
| 6,768,999 B2 | 7/2004 | Prager et al. |
| 6,795,094 B1 * | 9/2004 | Watanabe et al. ........... 715/762 |
| 6,801,919 B2 | 10/2004 | Hunt et al. |
| 6,803,926 B1 | 10/2004 | Lamb et al. |
| 6,823,344 B1 | 11/2004 | Isensee et al. |
| 6,847,959 B1 | 1/2005 | Arrouye et al. |
| 6,853,391 B2 | 2/2005 | Bates et al. |
| 6,865,568 B2 | 3/2005 | Chau |
| 6,876,996 B2 | 4/2005 | Czajkowski et al. |
| 6,880,132 B2 | 4/2005 | Uemura |
| 6,883,146 B2 | 4/2005 | Prabhu et al. |
| 6,906,722 B2 * | 6/2005 | Hrebejk et al. ............. 345/581 |
| 6,922,709 B2 | 7/2005 | Goodman |
| 6,980,993 B2 | 12/2005 | Horvitz et al. |
| 2001/0034711 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 * | 12/2001 | Kaplan et al. ........... 707/104.1 |
| 2002/0019935 A1 | 2/2002 | Andrew et al. |
| 2002/0033844 A1 * | 3/2002 | Levy et al. .................. 345/744 |
| 2002/0049717 A1 | 4/2002 | Routtenberg et al. |
| 2002/0054167 A1 | 5/2002 | Hugh |
| 2002/0059199 A1 | 5/2002 | Harvey |
| 2002/0062310 A1 | 5/2002 | Marmor et al. |
| 2002/0075310 A1 | 6/2002 | Prabhu et al. |
| 2002/0075312 A1 * | 6/2002 | Amadio et al. ............. 345/764 |
| 2002/0075330 A1 * | 6/2002 | Rosenzweig et al. ....... 345/854 |
| 2002/0087969 A1 | 7/2002 | Brunheroto et al. |
| 2002/0091679 A1 | 7/2002 | Wright |
| 2002/0091697 A1 | 7/2002 | Huang et al. |
| 2002/0091739 A1 * | 7/2002 | Ferlitsch et al. ............ 707/526 |
| 2002/0095416 A1 | 7/2002 | Schwols |
| 2002/0097278 A1 | 7/2002 | Mandler et al. |
| 2002/0104069 A1 | 8/2002 | Gouge et al. |
| 2002/0107973 A1 * | 8/2002 | Lennon et al. .............. 709/231 |
| 2002/0111942 A1 | 8/2002 | Campbell et al. |
| 2002/0113821 A1 * | 8/2002 | Hrebejk et al. ............. 345/764 |
| 2002/0120505 A1 | 8/2002 | Henkin et al. |
| 2002/0138582 A1 | 9/2002 | Chandra et al. |
| 2002/0152262 A1 | 10/2002 | Arkin et al. |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0196276 A1 | 12/2002 | Corl et al. |
| 2003/0009484 A1 | 1/2003 | Hamanaka et al. |
| 2003/0018657 A1 | 1/2003 | Monday |
| 2003/0069908 A1 | 4/2003 | Anthony et al. |
| 2003/0074356 A1 | 4/2003 | Kaier et al. |
| 2003/0093321 A1 | 5/2003 | Bodmer et al. |
| 2003/0093531 A1 | 5/2003 | Yeung et al. |
| 2003/0101200 A1 | 5/2003 | Koyama et al. |
| 2003/0105745 A1 | 6/2003 | Davidson et al. |
| 2003/0110188 A1 | 6/2003 | Howard et al. |
| 2003/0115218 A1 | 6/2003 | Bobbitt et al. |
| 2003/0117422 A1 | 6/2003 | Hiyama et al. |
| 2003/0126212 A1 | 7/2003 | Morris et al. |
| 2003/0135495 A1 | 7/2003 | Vagnozzi |
| 2003/0135517 A1 | 7/2003 | Kauffman |
| 2003/0140115 A1 | 7/2003 | Mehra |
| 2003/0154185 A1 | 8/2003 | Suzuki et al. |
| 2003/0177422 A1 | 9/2003 | Tararoukhine et al. |
| 2003/0210281 A1 | 11/2003 | Ellis et al. |
| 2003/0212710 A1 | 11/2003 | Guy |
| 2003/0225796 A1 | 12/2003 | Matsubara |
| 2003/0227487 A1 | 12/2003 | Hugh |
| 2003/0233419 A1 | 12/2003 | Beringer |
| 2004/0002993 A1 | 1/2004 | Toussaint et al. |
| 2004/0019655 A1 | 1/2004 | Uemura et al. |
| 2004/0030731 A1 | 2/2004 | Iftode et al. |
| 2004/0044696 A1 | 3/2004 | Frost |
| 2004/0044776 A1 | 3/2004 | Larkin |
| 2004/0054674 A1 | 3/2004 | Carpenter et al. |
| 2004/0070612 A1 | 4/2004 | Sinclair et al. |
| 2004/0083433 A1 | 4/2004 | Takeya |
| 2004/0085581 A1 | 5/2004 | Tonkin |
| 2004/0088374 A1 | 5/2004 | Webb et al. |
| 2004/0091175 A1 | 5/2004 | Beyrouti |
| 2004/0098370 A1 | 5/2004 | Garland et al. |
| 2004/0098379 A1 * | 5/2004 | Huang ............................ 707/3 |

| | | | |
|---|---|---|---|
| 2004/0098742 A1 | 5/2004 | Hsieh et al. | |
| 2004/0103280 A1 | 5/2004 | Balfanz et al. | |
| 2004/0117358 A1 | 6/2004 | Von Kaenel et al. | |
| 2004/0133572 A1 | 7/2004 | Bailey et al. | |
| 2004/0133588 A1 | 7/2004 | Keissig et al. | |
| 2004/0148434 A1 | 7/2004 | Matsubara et al. | |
| 2004/0153451 A1 | 8/2004 | Phillips et al. | |
| 2004/0167942 A1 | 8/2004 | Oshinsky et al. | |
| 2004/0189704 A1 | 9/2004 | Walsh et al. | |
| 2004/0189707 A1 | 9/2004 | Moore et al. | |
| 2004/0193594 A1 | 9/2004 | Moore et al. | |
| 2004/0193600 A1 | 9/2004 | Kaasten et al. | |
| 2004/0193621 A1 | 9/2004 | Moore et al. | |
| 2004/0193672 A1 | 9/2004 | Samji et al. | |
| 2004/0199507 A1 | 10/2004 | Tawa | |
| 2004/0205168 A1 | 10/2004 | Asher | |
| 2004/0205625 A1 | 10/2004 | Banatwala et al. | |
| 2004/0205633 A1 | 10/2004 | Martinez et al. | |
| 2004/0215600 A1* | 10/2004 | Aridor et al. | 707/3 |
| 2004/0220899 A1 | 11/2004 | Barney et al. | |
| 2004/0225650 A1 | 11/2004 | Cooper et al. | |
| 2004/0230599 A1 | 11/2004 | Moore et al. | |
| 2004/0230917 A1 | 11/2004 | Bales et al. | |
| 2004/0249902 A1 | 12/2004 | Tadayon et al. | |
| 2005/0010860 A1 | 1/2005 | Weiss et al. | |
| 2005/0015405 A1 | 1/2005 | Plastina et al. | |
| 2005/0027757 A1 | 2/2005 | Kiessig et al. | |
| 2005/0055306 A1 | 3/2005 | Miller et al. | |
| 2005/0080807 A1 | 4/2005 | Beilinson et al. | |
| 2005/0097477 A1* | 5/2005 | Camara et al. | 715/825 |
| 2005/0192953 A1 | 9/2005 | Neale et al. | |
| 2006/0020586 A1 | 1/2006 | Prompt et al. | |

OTHER PUBLICATIONS

Adobe inc. et al. "Adobe photshop 7.0" 2001.*
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.
"About Managing Messages With Rules", Microsoft® Outlook® 2003 Help file, 3 pp.
"Trillian/Trillian Pro IM Clients" Products Description, © 1999-2004 Cerulean Studios, <http://www.ceruleanstudios.com> [retrieved Apr. 30, 2004].
International Search Report of WO2004/097638 A1 (McKee, et al.) date Nov. 11, 2004.
Yong Kyu Lee et al., Metadata Management of the SANtopia File System, Proceedings of the 8th International Conference on Parallel and Distributed Systems (ICPADS 2001), Kyoungju City, Korea, Jun. 26-29, 2001, pp. 492-499, IEEE Computer Society, 2001, ISBN 0-7695-1153-8.
Horst F. Wedde et al., A Universal Framework for Managing Metadata in the Distributed Dragon Slayer System, Proceedings of The 26th EUROMICRO Conference (EUROMICRO'00), vol. 2, Maastricht, The Netherlands, Sep. 5-7, 2000, pp. 96-101, IEEE Computer Society, 2000, ISBN 1089-6503.
Jolon Faichney et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.
Dino Esposito, New Graphical Interface: Enhance Your Programs with New Windows XP Shell Features, MSDN Magazine, Nov. 2001, vol. 16, No. 11.
Stuart Yeates et al., Tag Insertion Complexity, Data Compression Conference, (DCC 2001), Snowbird, Utah, USA, Mar. 27-29, 2001, pp. 243-252, IEEE Computer Society, 2001, ISBN 1068-0314.

Bipin C. Desai et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.
Gulrukh Ahanger et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.
Jane Hunter, An Overview fo the MPEG-7 Description Definition language (DDL), IEEE Transactions on Circuits and Systems for Video Technology, Jun. 2001, pp. 765-772, vol. 11, No. 6, IEEE Computer Society, 2001, ISBN 1051-8215.
Philippe Salembier et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.
Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.
B.S. Manjunath et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Poster (eds.), ER 2003 Workshops, Lecture Notes in Computer Science 2814:402-407,2003.
Examples of dialogs user interfaces; date of first publication prior to Mar. 31, 2005; 8 pages.
"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.
New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.
Windows Forms: Exploiting Windows Longhorn Features from Within Your Application (CLI 391); downloaded from http:msdn.microsoft.com/longhorn/pdcmaterials/pdctalksavalon/>; date of first publication prior to Mar. 31, 2005; 27 pages.
MessageBox Function; downloaded from <http://msdn.microsoft.com>; date of first publication prior to Mar. 31, 2005; 4 pages.
Creating and Installing Theme Files; downloaded from <http://msdn.microsoft.com>; date of first publication prior to Feb. 21, 2005; 4 pages.
"MessageBox Function"; downloaded from <http://msdn.microsoft.com>; date of first publication prior to Mar. 31, 2005; 4 pages.
"Creating and Installing Theme Files"; downloaded from <http://msdn.microsoft.com>; date of first publication prior to Feb. 21, 2005; 4 pages.
"About Dialog Boxes"; downloaded from <http://msdn.microsoft.com>; date of first publication prior to Feb. 21, 2005; 10 pages.
"Property Sheets and Inspectors"; downloaded from <http://msdn.microsoft.com>; date of first publication prior to Feb. 21, 2005; 6 pages.
"PROPSHEETPAGE"; downloaded from <http://msdn.microsoft.com/>; date of first publication prior to Feb. 21, 2005; 3 pages.
"DialogProc Function"; downloaded from <http://msdn.microsoft.com>; date of first publication prior to Feb. 21, 2005; 2 pages.
"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"DRAWITEMSTRUCT Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn.microsoft.com>; date of first publication prior to Feb. 25, 2005; 5 pages.

"Using Dialog Boxes"; downloaded from <http://msdn.microsoft.com>; date of first publication prior to Mar. 31, 2005: 8 pages.

"CreatePropertySheetPage Function"; downloaded from <http://msdn.microsoft.com>; date of first publication prior to Mar. 31, 2005; 1 page.

"DestroyPropertySheetPage Function"; downloaded from <http://msdn.microsoft.com>; date of first publication prior to Mar. 31, 2005; 1 page.

"PropertySheet Function"; downloaded from <http://msdn.microsoft.com>; date of first publication prior to Mar. 31, 2005; 2 pages.

"PropSheetPageProc Function"; downloaded from <http://msdn.microsoft.com>; date of first publication prior to Mar. 31, 2005; 2 pages.

"PropSheet Proc Function"; downloaded from <http://msdn.microsoft.com>; date of first publication prior to Mar. 31, 2005; 2 pages.

"PSN_KILLACTIVE Notification"; downloaded from <http://msdn.microsoft.com>; date of first publication prior to Mar. 31, 2005; 1 page.

"PSN_QUERYCANCEL Notification"; downloaded from <http://msdn.microsoft.com>; date of first publication prior to Mar. 31, 2005; 1 page.

"PSN_RESET Notification"; downloaded from <http://msdn.microsoft.com>; date of first publication prior to Mar. 31, 2005, 1 page.

"PSN_SETACTIVE Notification"; downloaded from <http://msdn.microsoft.com>; date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSN_WISBACK Notification"; downloaded from <http://msdn.microsoft.com>; date of first publication prior to Mar. 31, 2005; 3 pages.

"PSN_WIZFINISH Notification"; downloaded from <http://msdn.microsoft.com>; date of first publication prior to Mar. 31, 2005; 1 page.

"PSN_WIZNEXT Notification"; downloaded from <http://msdn.microsoft.com>; date of first publication prior to Mar. 31, 2005; 3 pages.

"PSM_ADDPAGE Message"; downloaded from <http://msdn.microsoft.com>; date of first publication prior to Mar. 31, 2005; 2 pages.

"PSM_IDTOINDEX Message"; downloaded from <http://msdn.microsoft.com>; date of first publication prior to Mar. 31, 2005; 1 page.

"PSM_INDEXTOHWND Message"; downloaded from <http://msdn.microsoft.com>; date of first publication prior to Mar. 31, 2005; 1 page.

"PSM_INDEXTOID Message"; downloaded from <http://msdn.microsoft.com>; date of first publication prior to Mar. 31, 2005; 1 page.

"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.

"PSM_PRESSBUTTON Message"; downloaded from <http://msdn.microsoft.com>; date of first publication prior to Mar. 31, 2005, 1 page.

"PSM_QUERYSIBLINGS Message"; downloaded from <http://msdn.microsoft.com>; date of first publication prior to Mar. 31, 2005; 1 page.

"PSM_SETCURSEL Message"; downloaded from <http://msdn.microsoft.com>; date of first publication prior to Mar. 31, 2005; 1 page.

"PSM_SETCURSELID Message"; downloaded from <http://msdn.microsoft.com>; date of first publication prior to Mar. 31, 2005; 1 page.

"PSM_SETFINISHTEXT Message"; downloaded from <http://msdn.microsoft.com>; date of first publication prior to Mar. 31, 2005; 1 page.

"PSM_SETHEADERTITLE Message"; downloaded from <http://www.microsoft.com>; date of first publication prior to Mar. 31, 2005; 1 page.

"PSM_SETWIZBUTTONS Message"; downloaded from <http://msdn.microsoft.com>; date of first publication prior to Mar. 31, 2005; 2 pages.

"PROPSHEETHEADER Structure"; downloaded from <http://msdn.microsoft.com>; date of first publication prior to Mar. 31, 2005; 5 pages.

"PROPSHEETPAGE Structure"; downloaded from <http://msdn.microsoft.com>; date of first publication prior to Mar. 31, 2005; 4 pages.

"PSHNOTIFY Structure"; downloaded from <http://msdn.microsoft.com>; date of first publication prior to Mar. 31, 2005; 1 page.

"BCM_GETIDEALSIZE Message"; downloaded from <http://msdn.microsoft.com>; date of first publication prior to Mar. 31, 2005; 1 page.

"PSM_SETTITLE Message"; downloaded from <http://msdn.microsoft.com>; date of first publication prior to Mar. 31, 2005; 1 page.

Lee, J., "An End-User Perspective on File-Sharing Systems," Communications of the ACM 46(2):49-53, Feb. 2003.

Ohtani, A., et al., "A File Sharing Method For Storing Area Network and Its Performance Verification," NEC Res. & Develop. 44(1):85-90, Jan. 2003.

H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.

Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.

R. Rao, et al., "Rich Interaction in the Digital Library," Communications of the ACM 38(4):29-39. 1995.

Piernas, J., et al., "DuallFS: A New Journaling File System Without Meta-Data Duplication," Conference Proceedings of the 2002 International Conference on SUPERCOMPUTING, New York, Jun. 22-26, 2002, p. 137-146.

Manber, U., and S. Wu, "GLIMPSE: A Tool to Search Through Entire File Systems," Proceedings of USENIX Winter 1994 Conference, San Francisco, Ca, Jan. 17-21, 1994.

Coster, R., and D. Svensson, "Inverted File Search Algorithms for Collaborative Filtering," Proceedings of the 25th Annual International ACM SIGIR Conference on Research and Development in Information Retrievel, Tampere, Finland, Aug. 11-15, 2002.

Gifford, D.K., et al., "Semantic File Systems," Proceedings of the 13th ACM Symposium on Operating Systems Principles, Pacific Grove, CA., Sep. 1991, pp. 16-25.

Blair, C., and G.E. Monahan, "Optimal Sequential File Search: A Reduced-State Dynamic Programming Approach," European Journal of Operational Research 86(2):358-365, 1995.

Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.

Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating and Enhanced Metafile," downloaded from <http://msdn.microsoft.com>; date of first publication prior to Mar. 28, 2005; 2 pages.

"Common Dialog Box Library," downloaded from <http://msdn.microsoft.com>: date of first publication prior to Mar. 28, 2005; 8 pages.

"OPENFILENAME Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication date prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

Heinlein, et al., "Integration of Message Passing and Shared Memory in the Stanford FLASH Multiprocessor, Architectural Support for Programming Languages and Operating Systems," pp. 38-50, published 1994.

Louis, et al., "Context Learning Can Improve User Interaction Information Reuse and Integration," Proceedings of the 2004 IEEE International Conference on, pp. 115-120, Nov. 8-10, 2004.

Cohn, et al., "A Case for Associative Peer to Peer Overlays"—ACM SIGCOMM Computer Communications Review, vol. 33, No. 1, Jan. 2003, pp. 95-100.

Lui, et al., "Interoperability of Peer-to-Peer File Sharing Protocols"—ACM SIGecom Exchanges, vol. 3, No. 3, Aug. 2002, pp. 25-33.

Wikipedia, File Allocation Table, 2006, <http://en.wikipedia.org/wiki/File_Allocation_Table>.

* cited by examiner

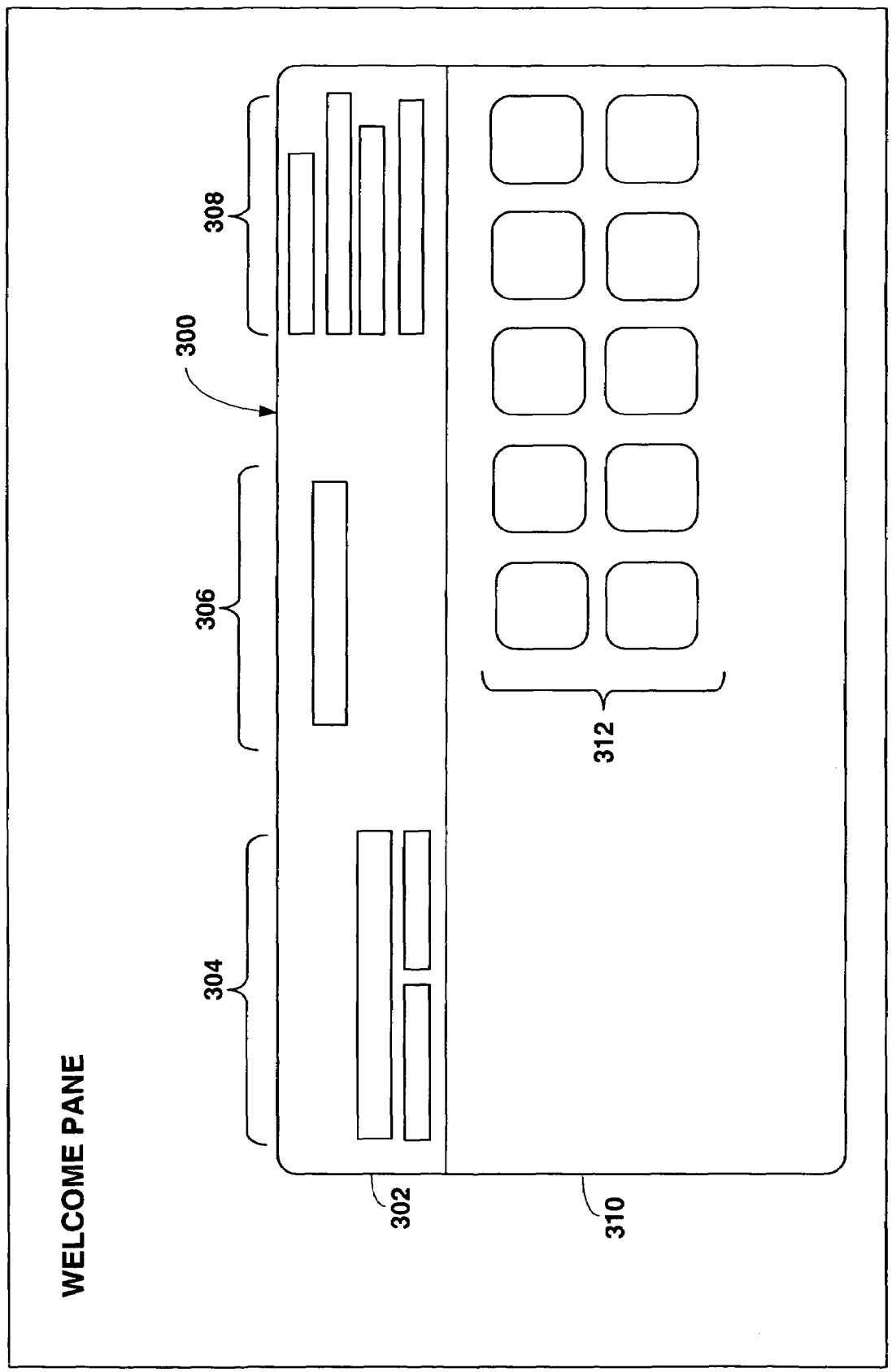

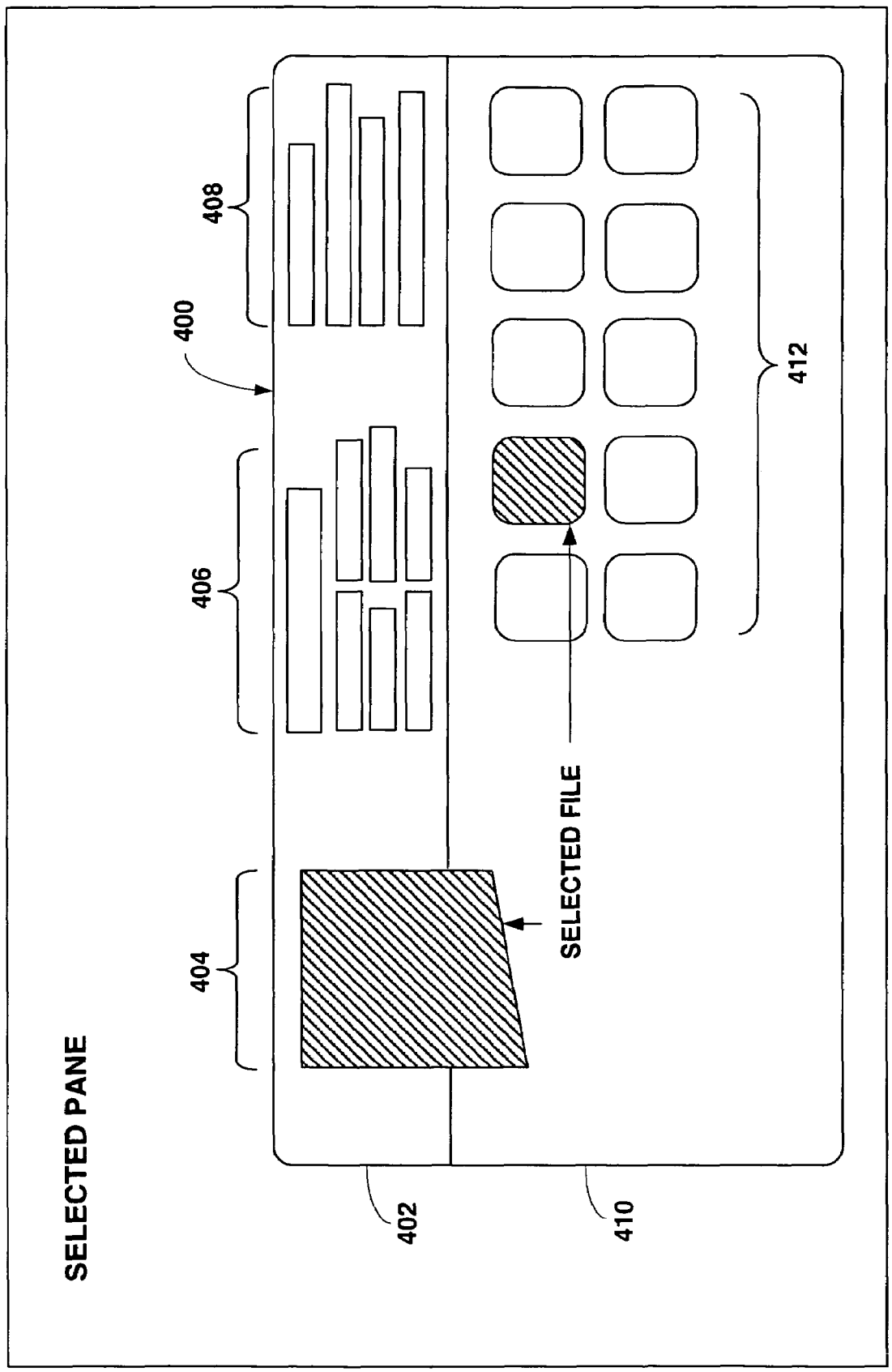

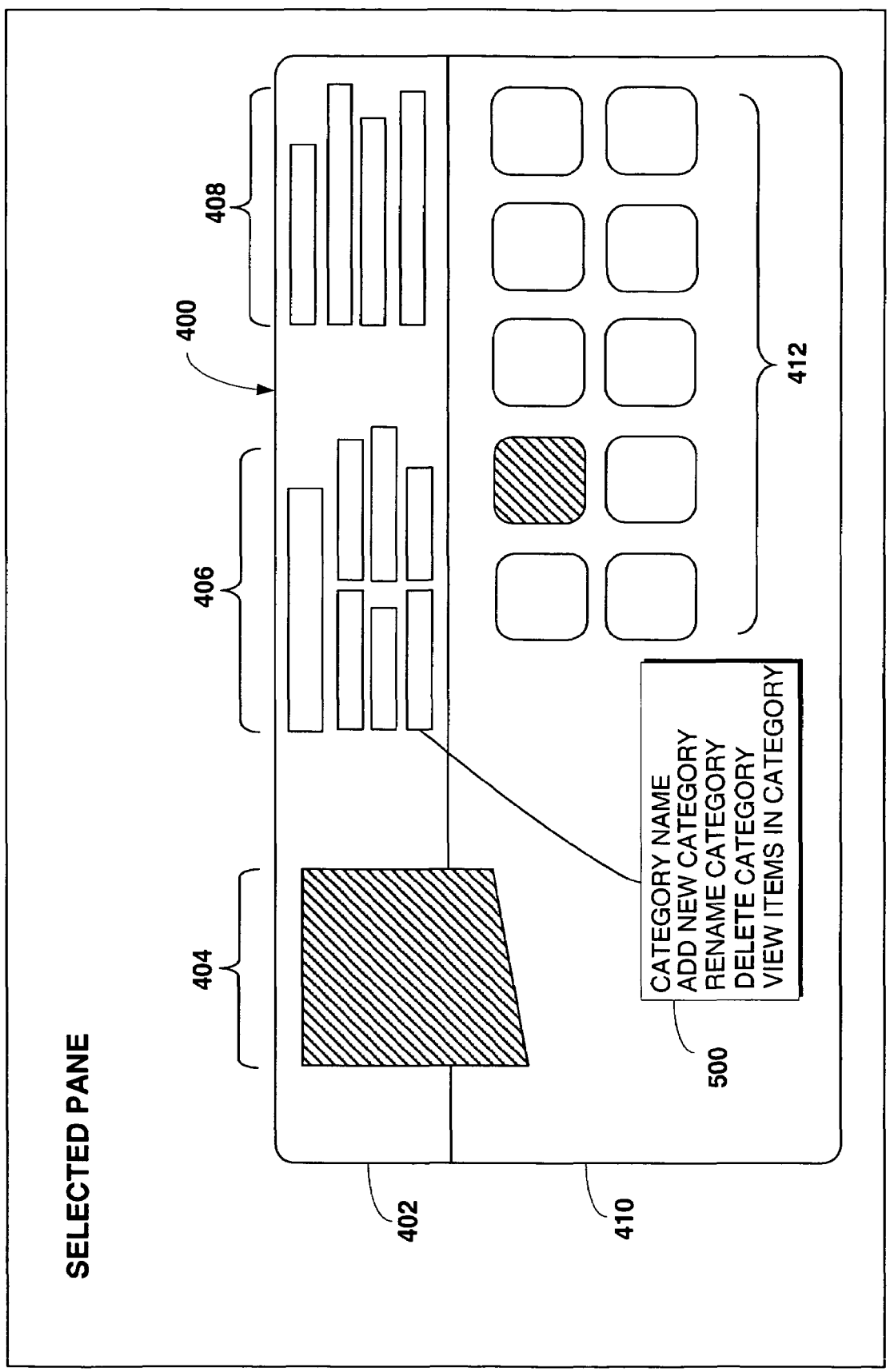

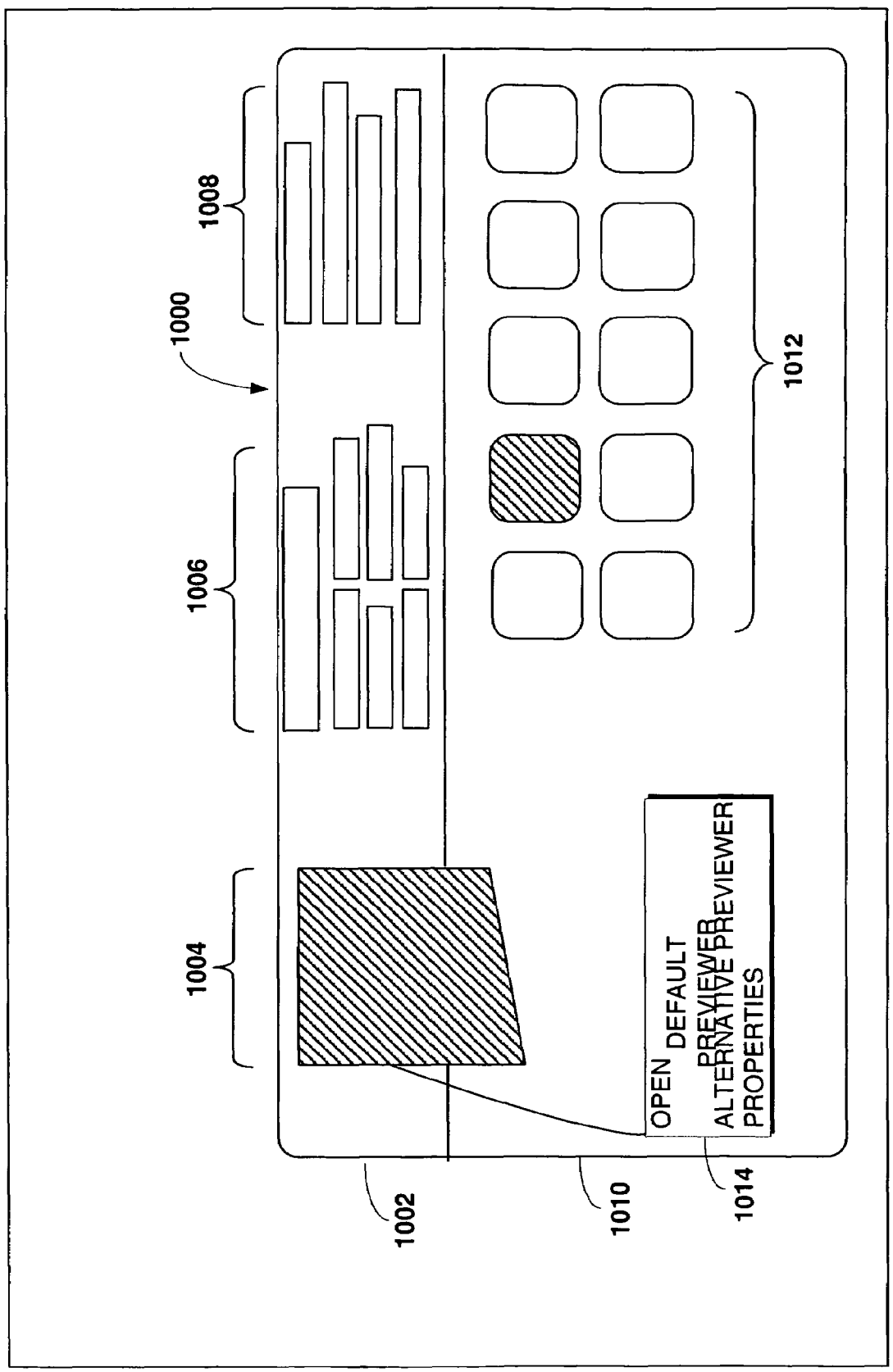

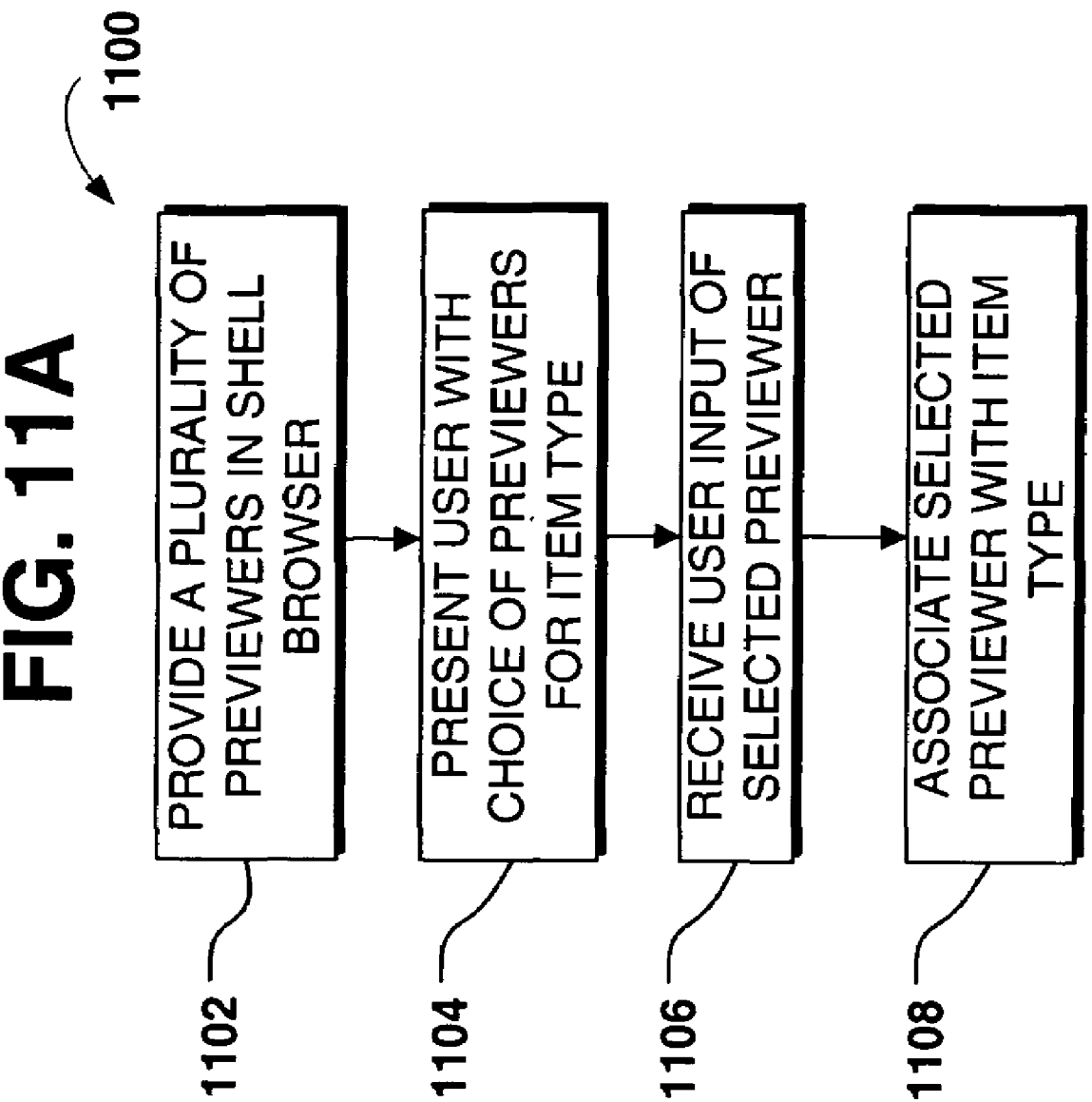

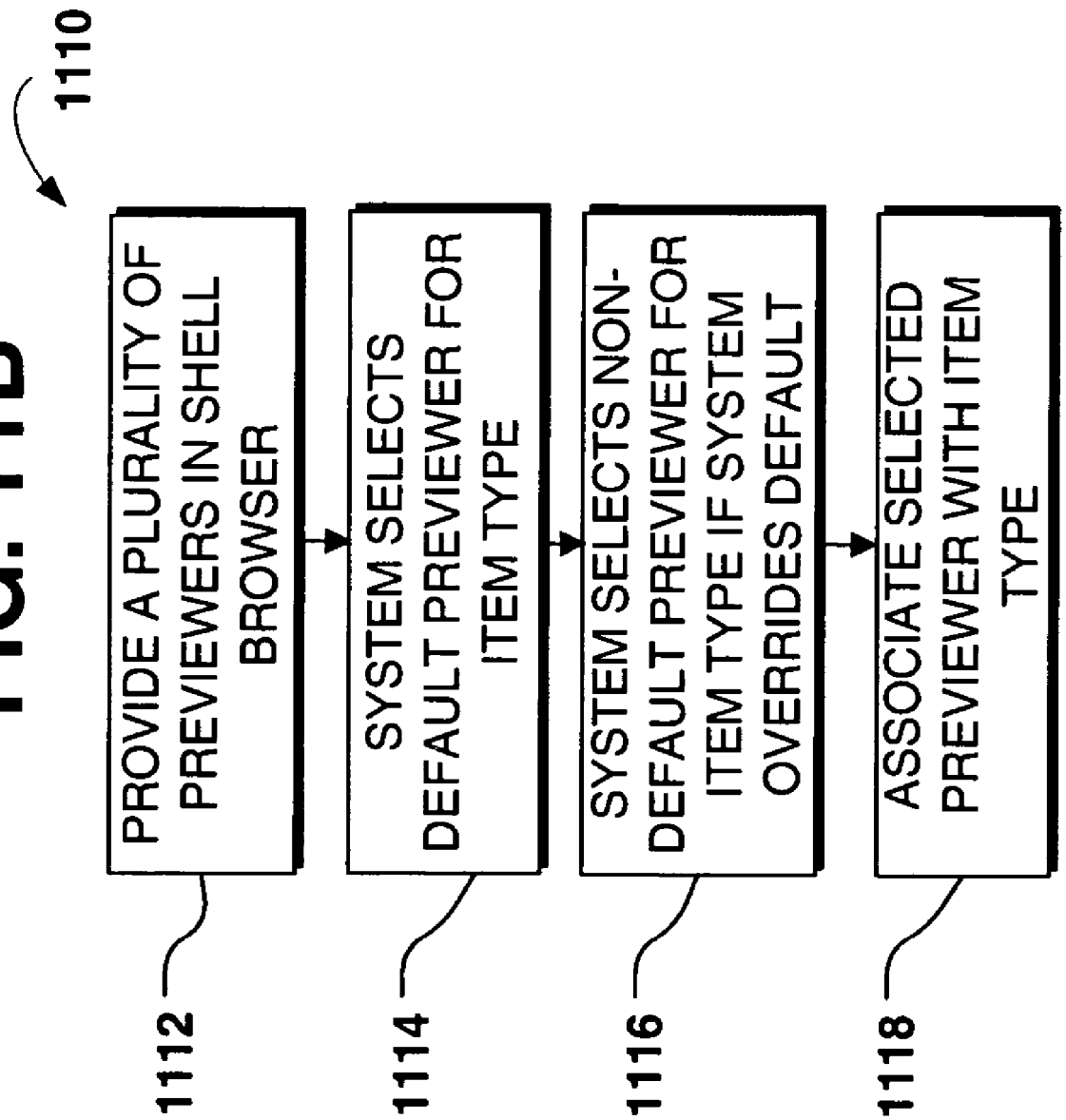

SYSTEM AND METHOD FOR VIEWING AND EDITING MULTI-VALUE PROPERTIES

CROSS-REFERENCE TO RELATED APPLICATIONS

The present application is a continuation-in-part of copending U.S. patent application Ser. No. 10/395,533, filed Mar. 24, 2003, entitled "System and Method for User Modification of MetaData in a Shell Browser," and U.S. patent application Ser. No. 10/395,560, filed Mar. 24, 2003, entitled "Extensible Object Previewer in a Shell Browser," the specifications for which are hereby incorporated by reference.

TECHNICAL FIELD

The present application relates generally to the field of computer software. More particularly, the application relates to a system and method for providing an improved user experience when viewing multiple-value properties of files on a system. Some aspects relate to the manner in which aggregated multiple-value properties are selected and prioritized for display.

BACKGROUND OF THE INVENTION

The need to readily identify items stored in a computing environment such as a personal computer (PC) is dramatically increasing as more individuals utilize computers in their daily routines, and as the type of stored information varies between pictures, music, documents, etc. Documents and media are typically stored on computers in a hierarchical fashion and are organized with files of information or media stored within folders. File system browsers enable users to navigate through the file system and locate and open files and folders. For example, Microsoft Corporation's WINDOWS® EXPLORER™ is an operating system utility which enables users to browse the file system.

When browsing files on a system, some systems may display one or more properties or file attributes for a selected file. The WINDOWS® EXPLORER™ allows users to right-click a mouse button on a file icon, and view a pop-up dialog containing selected properties of the file. Properties may include file type, location, size and creation date, but are rather limited in scope. As computing systems become more and more sophisticated, more sophisticated properties and property presentation techniques will be desirable.

One type of more sophisticated property is the multi-value property. A multi-value property is a property that may have more than one value associated with it. For example, in the MICROSOFT OUTLOOK® email program, an email's addressee field ("To") may have multiple addressees.

Users often have difficulty editing multi-value property fields. Some users have difficulty with the delimiters (such as semicolons) used to separate the multiple values in the displayed multi-value property fields. MICROSOFT OUTLOOKS® uses a semicolon to separate the multiple entries, and users often either fail to notice this delimiter, accidentally delete it, or accidentally insert too many delimiters, as they go about editing the "To" field for their email. Other users misspell entries in the multi-value fields, causing greater confusion down the road.

Accordingly, there is a need for an improved way of handling the display of properties, and of managing multi-value properties, to simplify the user's experience in navigating and managing files on a computing system.

SUMMARY OF THE INVENTION

Aspects of the present invention may meet one or more of the above needs, and overcome one or more deficiencies in the prior art, by providing a system and method for user modification of properties (or metadata). In one aspect, a shell browser is provided which includes a display of file properties that may include multi-value properties. The user may edit the multi-value property, and the system may intelligently assist the user in editing the multi-value property. The system may tokenize the multi-value property values, and may provide persistent prompt text within a multi-value property field as a reminder to the user of the field's options.

The system may display aggregated property values, and may incorporate visual differences to associate aggregated values with the files to which they apply. Editing of the aggregated values is possible, and when editing aggregated multi-value properties, the system may intelligently assist the user in selecting (or avoiding) entries based on a variety of factors, such as the entries already in use and the context in which the property values are used.

When aggregating multi-value properties for multiple selected files, the system may also take steps to help preserve the order in which particular values appeared in the various files. Values that tended to appear more often in the beginning of a file's multi-value property will tend to appear towards the beginning of the corresponding aggregated multi-value property.

BRIEF DESCRIPTION OF THE DRAWINGS

The present invention is described in detail below with reference to the attached drawing figures, wherein:

FIG. 3 is a schematic diagram of a welcome panel in a shell browser;

FIG. 4 is a schematic diagram of a selected panel in a shell browser;

FIG. 5 is a schematic diagram of the selected panel of FIG. 4 including a context menu enabling a user to modify metadata in a shell browser.

FIG. 10 is a schematic diagram of a selected panel similar to FIG. 4 but including a context menu enabling a user to select a previewer in a shell browser.

FIG. 11A is a flow diagram illustrating a method for enabling a user to select a previewer in a shell browser.

FIG. 11B is a flow diagram illustrating a method for enabling the system to select a previewer in a shell browser.

DETAILED DESCRIPTION OF THE INVENTION

The present invention relates to a system and method for providing an improved user experience within a shell browser by offering users a preview of one or more selected files from the browser. An exemplary operating environment for the present invention is described below.

Figure 1:
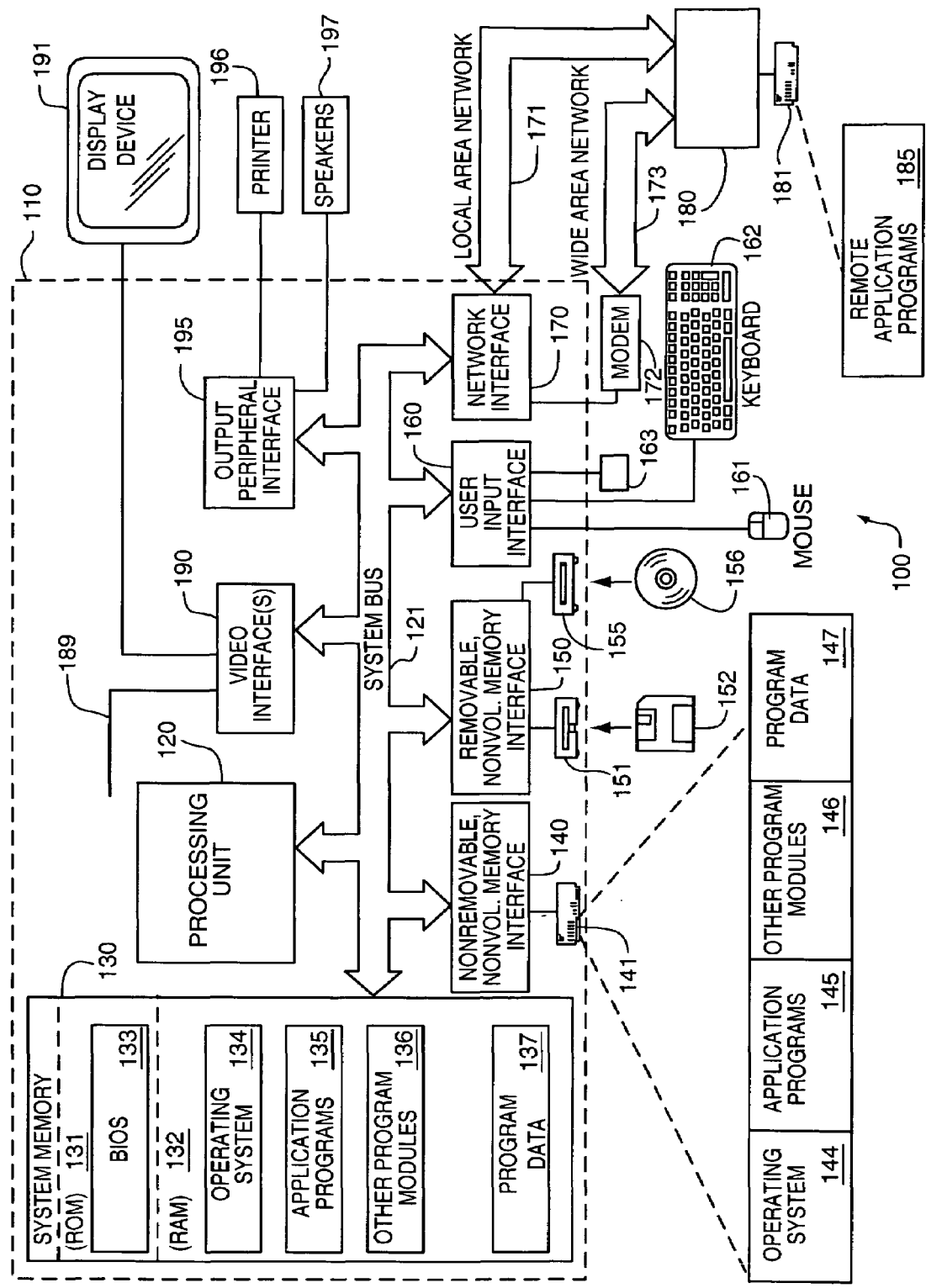
FIG. 1 is a block diagram of a computing-system environment suitable for use in implementing one or more features described herein.

Referring to the drawings in general and initially to FIG. 1 in particular, wherein like reference numerals identify like components in the various figures, an exemplary operating environment is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The features described herein may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the features may be practiced with a variety of computer-system configurations, including hand-held devices, multiprocessor systems, microprocessor-based or programmable-consumer electronics, minicomputers, mainframe computers, and the like. They may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 includes a general purpose computing device in the form of a computer 110 including a processing unit 120, a system memory 130, and a system bus 121 that couples various system components including the system memory 130 to the processing unit 120. If desired, any of the elements described herein may be implemented as standalone elements (e.g., a single processing unit), or as multiple elements working in concert (e.g., multiple processing units).

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/non-removable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Other internal components of the computer 110 are possible, but not shown. For example, various expansion cards such as television-tuner cards and network-interface cards may be incorporated within a computer 110.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the features described herein may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2A:
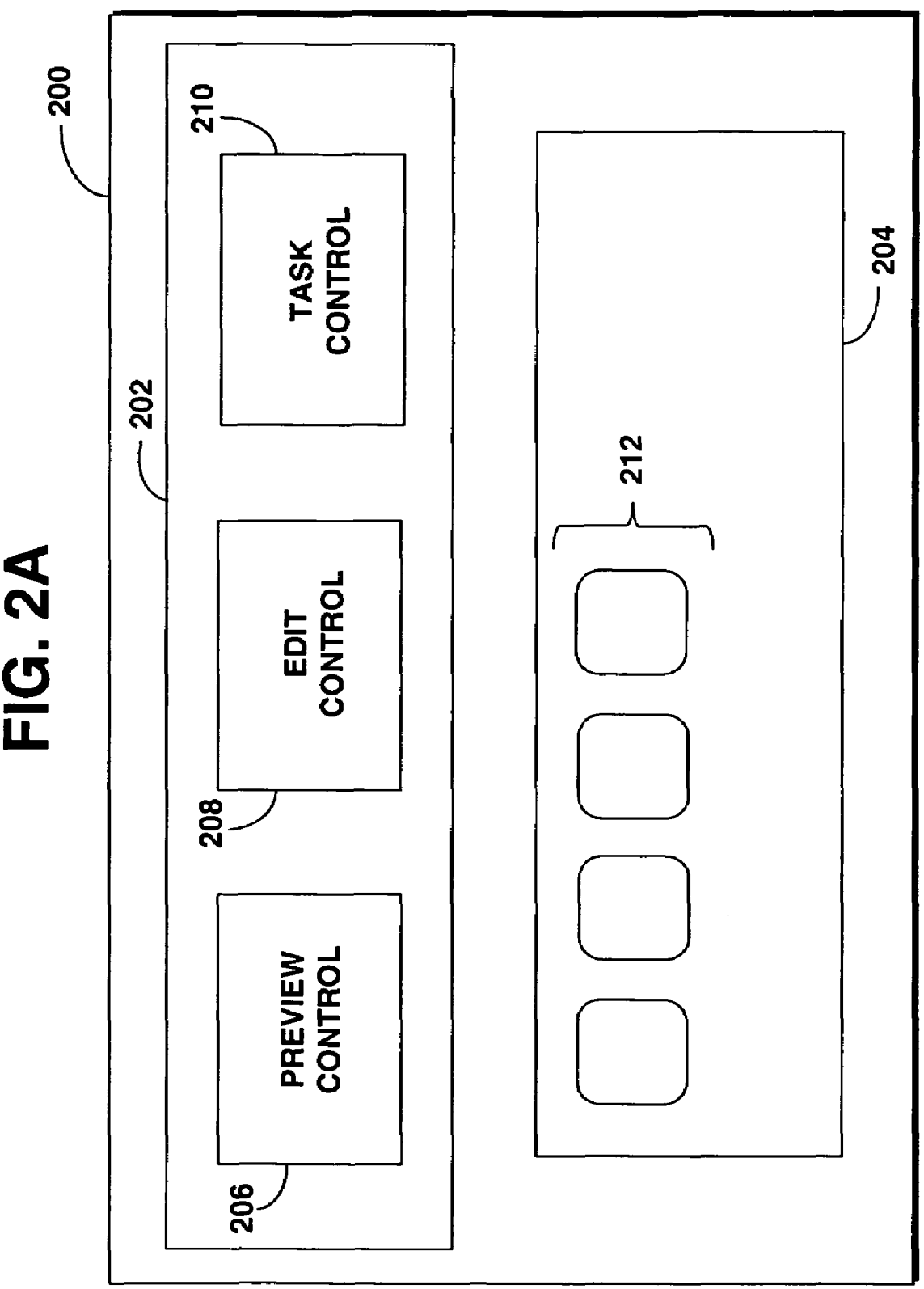
FIG. 2A is a block diagram of an exemplary graphical user interface for a shell browser having an edit control.

Turning to FIG. 2A, a panel 200 represents a screen-size display area for a graphical user interface of a shell browser. The panel 200 contains a preview panel area 202 and a view area 204. The preview panel 202 may include a preview control 206, a user interface (UI) or edit control 208, and a task control 210. Typically, the preview control 206 will provide the user with an image or other visual display of the item being previewed (e.g., a selected file). The preview control 206 may also present the user with controls such as iterator buttons which allow the user to shift the focus from one item to the next by clicking a mouse button. Metadata corresponding to one or more items and/or metadata corresponding to the item container may be displayed in a variety of locations within the panel 200. For example, the edit control and metadata may be co-located within edit control area 208 so that the edit control area not only includes a display of key properties of the previewed item but also presents the user with the option of making edits to the metadata. The task control 210 contains tasks relevant to the namespace and/or the selection. The various elements described herein may share a display area, such as appearing in a common user-interface panel, or alternatively they may have their own separate areas, such as distinct panels.

Optional features may be included within the panel 200, and features may be removed. For example, the preview control 206 and the task control 210 may be removed. Moreover, other features which are not shown in FIG. 2A, such as a toolbar which includes iterator buttons or a show/hide button so the user can open/close the preview pane, may optionally be added. These and other optional features may assist the user in readily locating a particular item in the shell browser.

The view area 204 provides a listview, such as an enumeration or list of items, of one or more items 212, such as file system files or folders. The items and shell items may be files, folders and/or other such containers, and may include other non-file objects that can be represented in a listview. Examples of non-file objects may include, but would not be limited to, devices, contacts, favorites and email messages. The terms "shell browser" and "file system browser" are used interchangeably herein to refer to a browser which allows a user to navigate through one or more namespaces including files and other non-file items.

Many possible designs and layouts are possible for the panel 200. For example, the preview panel 202 is shown above the view area 204 in FIG. 2A. However, other layouts, such as placing the preview panel 202 and the view area 204 side-by-side, are possible as well. The location of the edit control 208 may also be independent of the location of the displayed metadata and independent of the location of any other controls. There are also many possible view types for the items depicted in listview area 204, such as details, slide show, filmstrip, thumbnail, tiles, icons, etc.

Figure 2B:
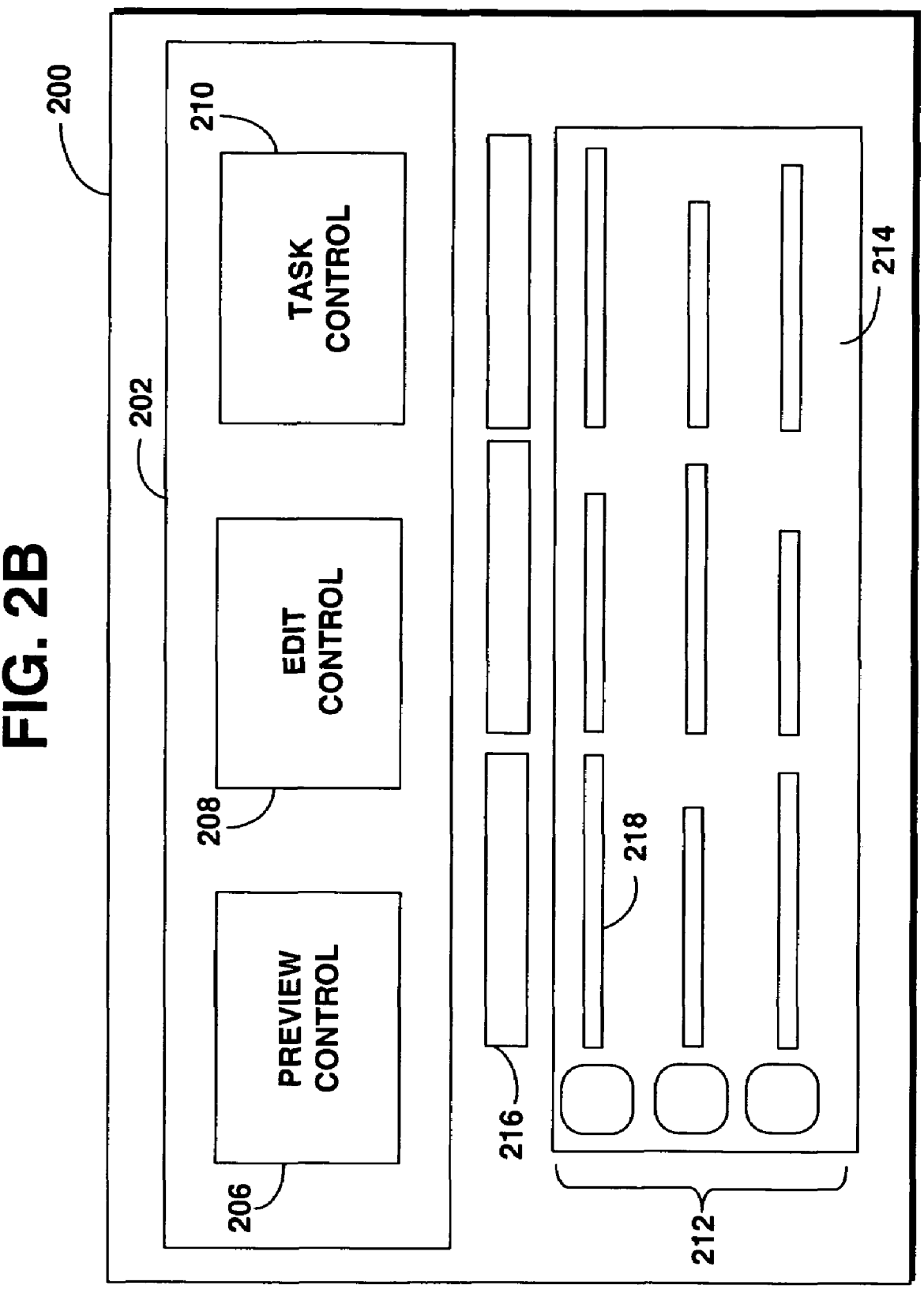
FIG. 2B is a block diagram of an exemplary graphical user interface for a shell browser having one or more edit controls.

FIG. 2B is similar to FIG. 2A, except that the view area 204 is replaced by a view area 214 which displays the items 212 in details mode. For shell items displayed in details mode, the items 212 may be aligned in a column at the left-hand side of view area 214, and one or more column headings 216 form the top row of a set of columns containing metadata 218 relating to the corresponding item located in the same row. The user may change a metadata value to another value through instantiation of one or more edit controls 208 anywhere within the panel 200. For example, an edit control may be provided within the preview panel 202 and/or within the view area 214. For example, an edit control which is not initially visible to a user may be provided within the view area 214. Such a control can be instantiated, for example, when the user hovers over the metadata 218 and then clicks on it to enter an editing mode.

Referring next to FIG. 3, a schematic illustration is provided of a welcome panel 300 in a shell browser. A welcome panel is sometimes referred to as a "null select" panel because it represents a namespace/page or container as opposed to a selection. If the user has not yet made a selection, a preview panel 302 may display metadata 304 and key tasks relating to the folder or shell library. If desired, the tasks may be separated into premiered tasks 306 and other relevant tasks 308. The welcome panel 300 also includes a view area 310, in which multiple files or other items 312 may be viewed. The welcome pane metadata 304 may include information such as properties of the container (e.g., MyPictures), in which case the metadata display may be static. Alternatively, the welcome pane metadata 304 may include information such as a sampling of metadata from each of the items within the container, in which case the metadata display may change frequently. For example, the metadata display may be limited to properties of one item at a time by cycling from one item to the next every 30 seconds.

FIG. 4 is a schematic illustration of a selected panel 400 in a shell browser. As opposed to a welcome panel, a selected panel represents a selection by the user. If the user selects a container or folder, the selected panel need not be identical to the welcome panel for that container or folder. In FIG. 4, the selected panel 400 includes a preview panel 402 which contains a preview control 404, a metadata display 406 and a tasks display 408. Like the welcome panel 300 (in FIG. 3), the selected panel 400 also includes a view area 410, in which multiple files or other items 412 may be viewed. In FIG. 4, however, the user has selected one of the files. Consequently, the preview control 404 displays a preview image of the selected file, the metadata display 406 shows properties of the selected file, and the tasks display 408 provides a menu of relevant tasks for operating on the selected file.

FIG. 5 is a schematic representation of the selected panel of FIG. 4 but which also includes a context menu 500 to enable a user to modify metadata in a shell browser. The context menu 500 in FIG. 5 presents the user with several options for changing the selected metadata. The generic text shown in the menu 500 is of course merely one example of the type of options which may be presented to a user for editing the displayed metadata. A context menu can be provided in any panel, including a welcome pane, to improve the user experience. As those skilled in the art will appreciate, any number and variety of context menus could be supported. One means for enabling user modifications to displayed metadata within a shell browser is to provide a context menu such as editable metadata context menu 500. A user may summon the context menu, for example, by clicking on the corresponding text or object in the preview panel.

Means other than context menus may be used for enabling user modifications to displayed metadata within a shell browser. One such means for is for the user to click on the metadata to enter an editing mode. By contrast, a user could enter an editing mode by hovering over the relevant text or object in the preview panel. Any known form of entering and/or editing data may be used.

Figure 6:
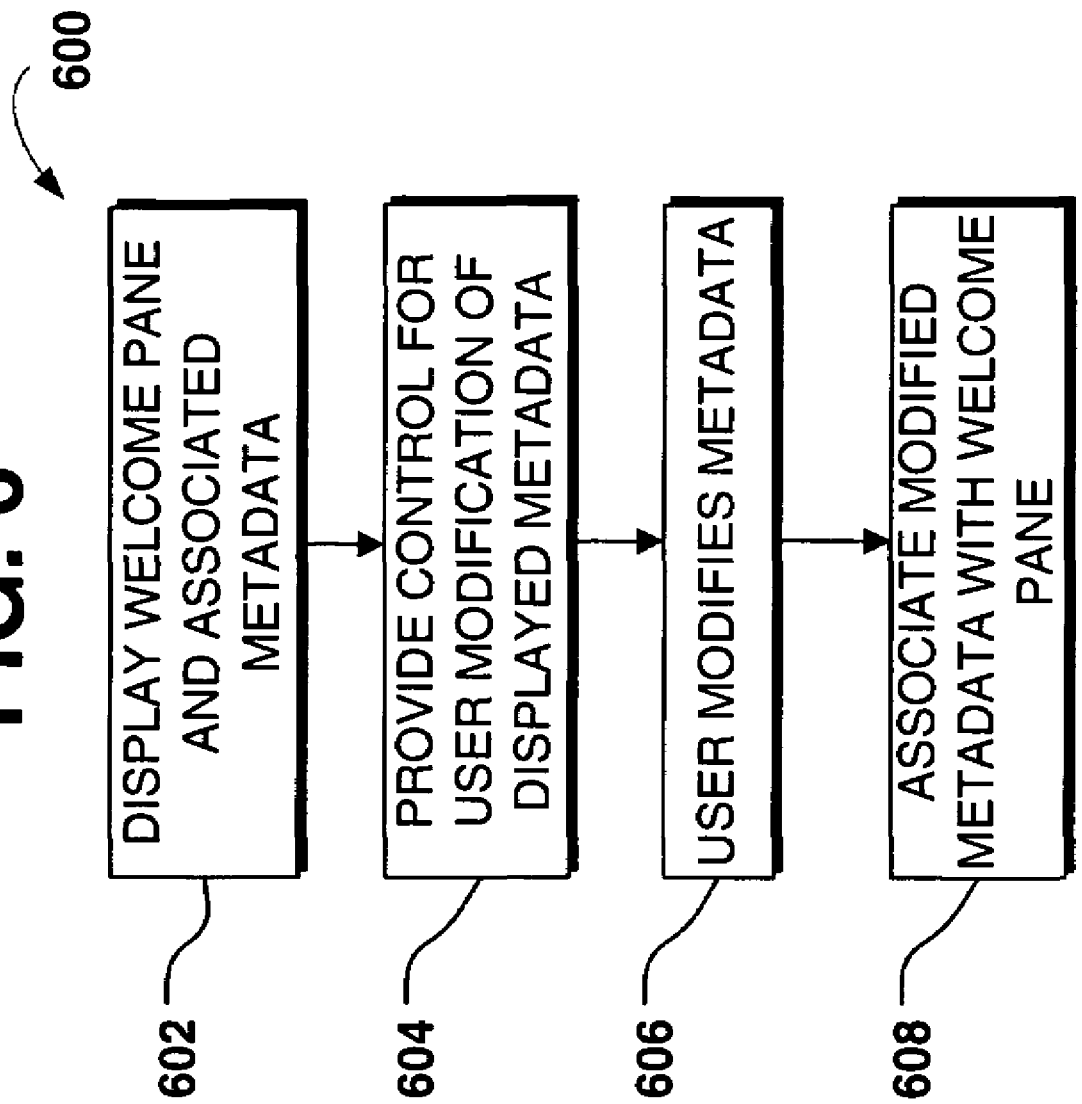
FIG. 6 is a flow diagram illustrating a method for enabling a user to modify metadata displayed in a welcome panel within a shell browser.

FIG. 6 is a flow diagram illustrating a method 600 for enabling a user to modify metadata displayed in a welcome panel within a shell browser. The method 600 includes displaying a welcome panel and metadata associated with the welcome panel at 602. Then, at 604, the method provides a control for user modification of the displayed metadata. When the user manipulates the control to modify the displayed metadata at 606, the method then associates the modified metadata with the welcome panel at 608 so that the modified metadata will be displayed the next time the welcome panel is displayed.

Figure 7:
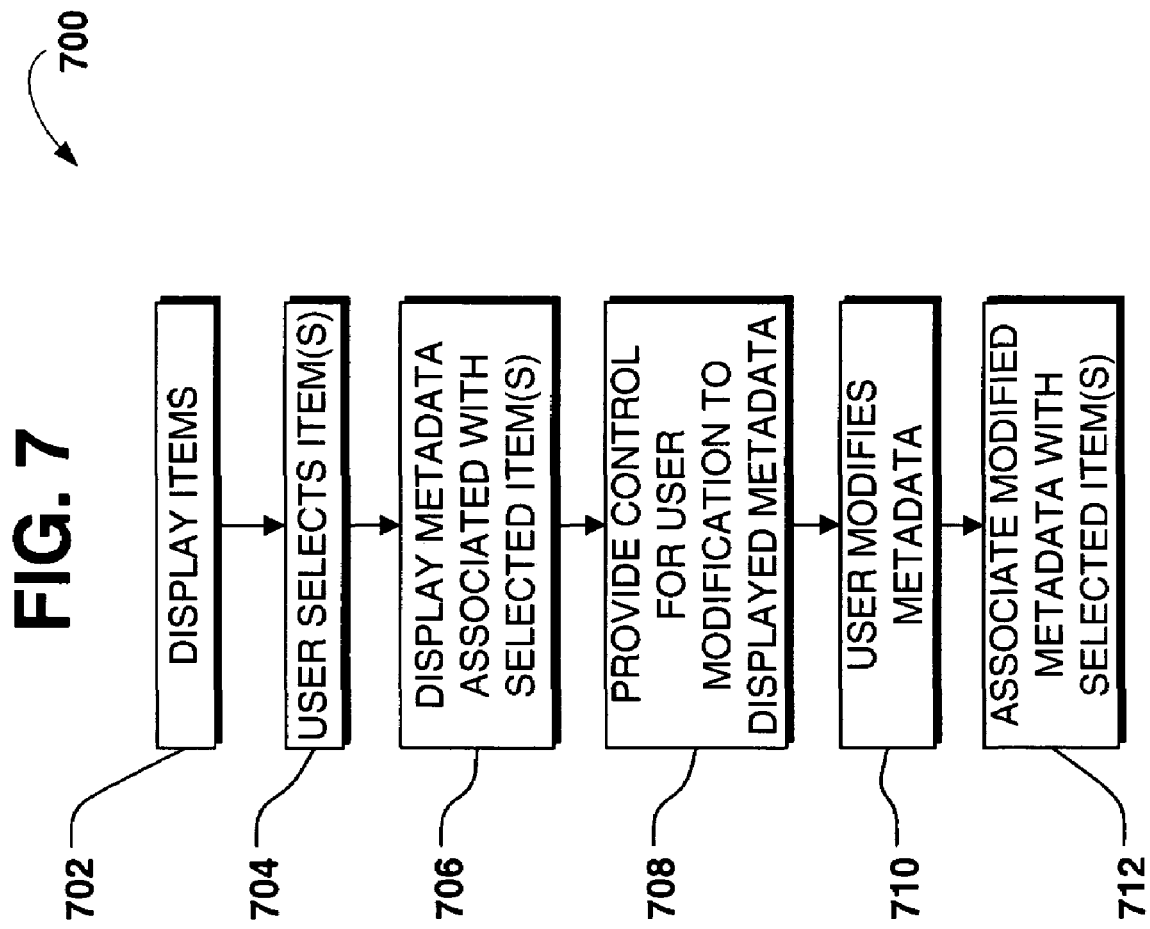
FIG. 7 is a flow diagram illustrating a method for enabling a user to modify metadata displayed in a selected panel within a shell browser.

FIG. 7 is a flow diagram illustrating a method 700 for enabling a user to modify metadata displayed in a selected panel within a shell browser. At 702, the method 700 first displays a number of items, such as items in a welcome panel or items in a selected container. When the user selects one or more of the items at 704, the method displays metadata associated with the selected item(s) at 706. At 708, the method provides a control for user modification of the displayed metadata. When the user manipulates the control to modify the displayed metadata at 710, the method then associates the modified metadata with the selected item(s) at 712 so that the modified metadata will be displayed the next time the selected item(s) is/are displayed.

In the event a user selects multiple items at 704, the displayed metadata may include intersecting properties of the selected items, a union of properties, or perhaps a new property relevant to the selected items. For example, data may be aggregated to provide a total file size, total playing time, total number of items, average file size, average playing time, etc. Alternatively, the displayed metadata may include a rotating sample of metadata from each of the selected items (e.g., cycling from one selected item's metadata to the next selected item's metadata every 30 seconds). It is possible for the display of metadata which would result from a selection of all of the items to be identical to the display of metadata which would result from a null select.

Figure 8:
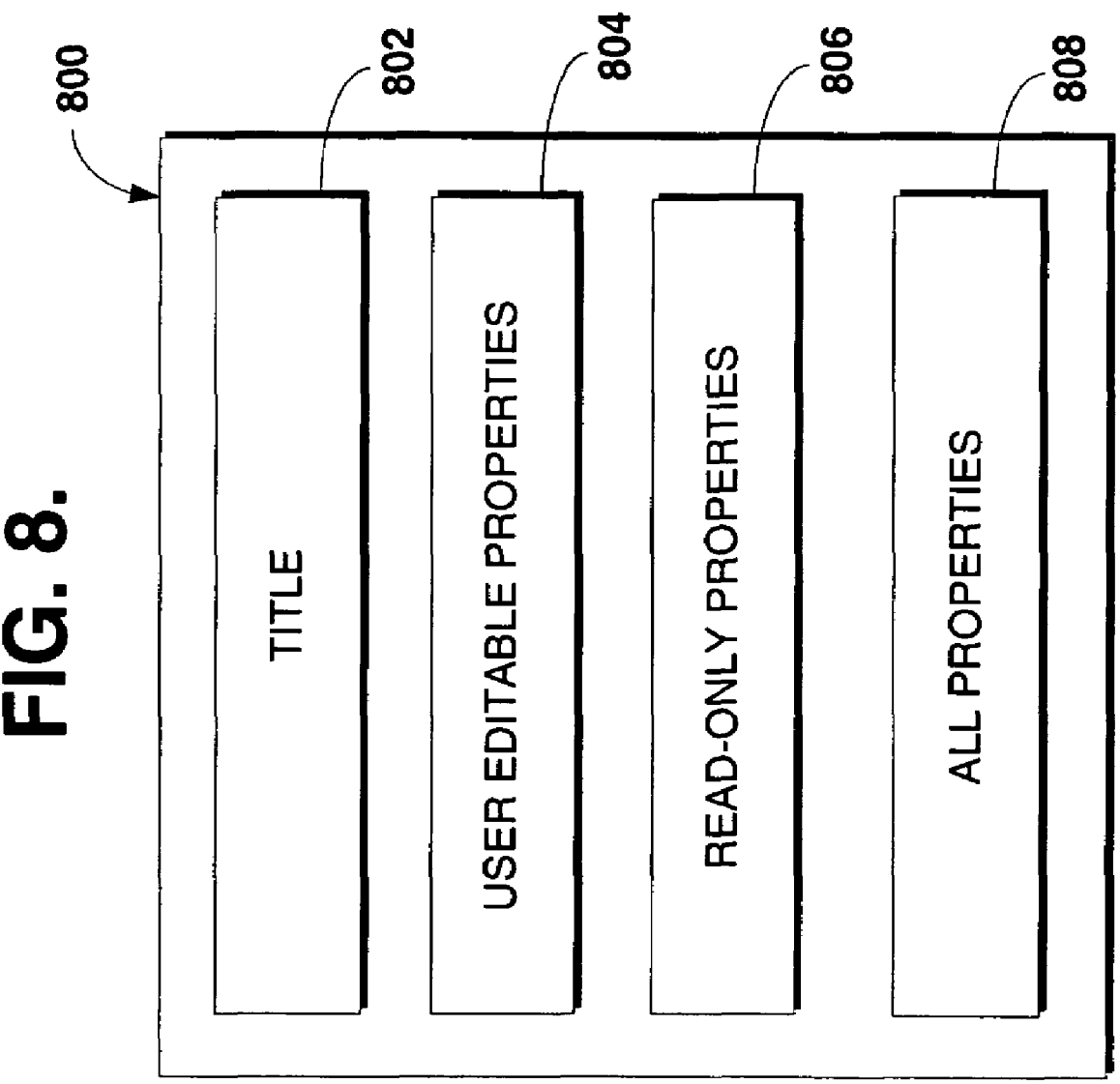
FIG. 8 is a block diagram of a data structure containing user modifiable metadata associated with an item displayed in a shell browser.

FIG. 8 is a block diagram of a data structure 800 containing user modifiable metadata associated with an item displayed in a shell browser. The data structure 800 includes a title field 802 which indicates the name of the item. In the case of non-file items, the title field 802 may contain the name of whatever property is used to alphabetize that item in a listview. The data structure 800 includes a user editable properties field 804 containing one or more properties associated with the displayed item, wherein the user editable properties are displayed in the shell browser with the displayed item. The data structure 800 may optionally include a read-only properties field 806 which contains any read-only properties associated with the displayed item and worthy of display in the shell browser. Given the size constraints of the metadata display in the shell browser, the number of properties in fields 804 and 806 may be limited. Consequently, the data structure 800 may optionally include an all properties field 808, which contains a link or pointer to a location (e.g., a property page) which contains all of the properties or metadata associated with the displayed item. Of course, the all properties field 808 would not be necessary in the event that fields 804 and 806 contain all of the properties associated with the displayed item. The data structure 800 is stored on one or more computer-readable media, such as in a file system or shell, to provide rich storage views, and thus an improved user experience, within the shell browser.

A number of scenarios may be enabled with the features described herein. As a first example, a student can manage her projects using the preview panel. When she obtains new documents as part of a project she is working on, she can select those documents in her document library and enter the name of the document author and the name of the project into keyword fields using the edit control. Now the new documents will show up in her favorite view: "Documents Grouped by Keyword and Listed by Author." A second example involves an employee looking for materials for an upcoming ad campaign. As he browses through his employer's stock collection of photos using the shell browser, he selects a couple of pictures and, from the preview pane, adds a new keyword "Summer 2003 Campaign." Having updated the metadata for a multiple selection, the employee then pivots by keyword and can view all of the "Summer 2003 Campaign" files grouped together.

Figure 9:
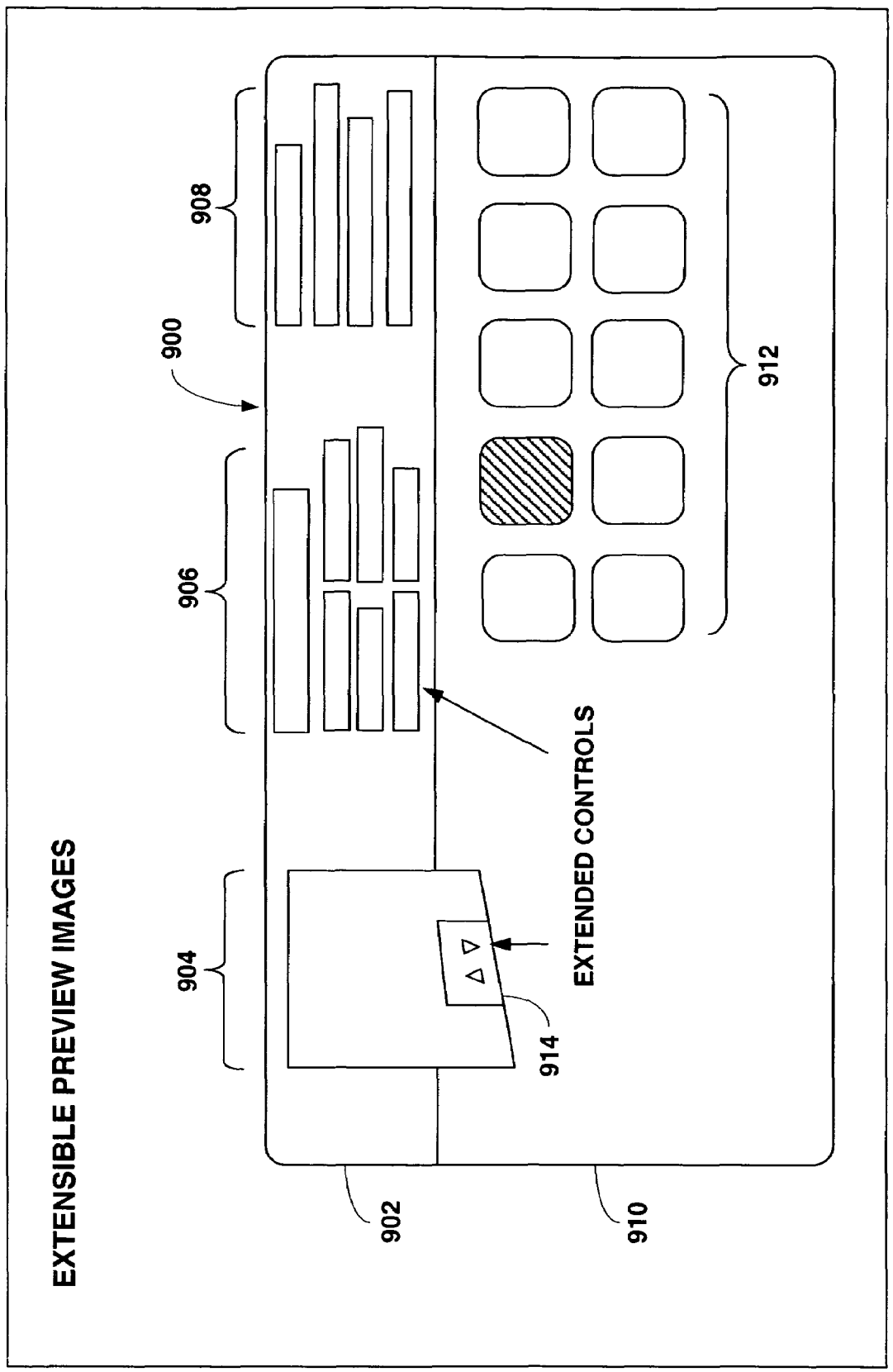
FIG. 9 is a schematic diagram of a selected panel in a shell browser with extended controls.

FIG. 9 is a schematic diagram of a selected panel similar to the selected panel of 400 of FIG. 4 but with extended controls. The selected panel 900 includes a preview panel 902 which contains a preview control 904 having extended controls 914, a metadata display 906 and a tasks display 908. The selected panel 900 also includes a view area 910, in which multiple files or other items 912 may be viewed. The user has selected one of the files 912, so the preview control 904 displays a preview image of the selected file, the metadata display 906 shows properties of the selected file, and the tasks display 908 provides a menu of relevant tasks for operating on the selected file.

The extended controls 914 represent a higher level of functionality. For example, a default preview panel or preview control, such as that shown in FIG. 4, may simply display a preview image of a selected item. If the item is a word processing document or slide presentation, the default preview image may be the first page of the document or slide deck. However, by extending the functionality of the preview image to make it more interactive, a user can quite easily manipulate extended controls 914 to page through the document or slide presentation. This enhanced level of functionality improves the user experience because it allows the user to more comprehensively browse the previewed item without opening it, which is particularly useful for files that are not readily identifiable based on the first page alone.

Extended controls 914 can be made available to the user as part of an alternative previewer in a shell browser. The term "previewer" can refer to a preview control, a preview panel which includes a preview control, or software relating to the selection, generation and/or display of previews. A shell browser may provide the user with a default previewer offering a standard level of functionality for multiple item types and one or more alternative previewers offering a different level of functionality for particular item types to enhance the user experience. Opening up the development of alternative previewers to independent software vendors (ISVs) and other third party developers adds value to the file browsing experience by showing relevant aspects of the file in an easily recognizable way. Custom previewers for numerous file types and non-file item types including, but not limited to, image files, video files, contacts, games, scanners, video cameras, document files, spreadsheet files, slide presentation files, drawing files and tablet ink files may be developed.

Third parties are allowed to describe and demonstrate their file types by providing code that can look inside the file type and provide a meaningful image that a user will understand. For example, Apple could implement a QUICKTIME™ preview control, which would be displayed when the user selects a QUICKTIME™ file in the shell browser. This preview control could provide an alternative or extended level of functionality beyond the default previewer in the shell of an operating system, including functionality such as showing the entirety or a portion (e.g., the first five seconds) of a QUICKTIME™ movie and/or offering buttons and controls for the user to launch the QUICKTIME™ player. An alternative previewer for a music file could provide similar extended functionality. As those skilled in the art will appreciate, the possibilities for extended functionality in an alternative previewer are unlimited.

FIG. 10 is a schematic representation of a selected panel similar to FIG. 4 but which also includes a context menu 1014 to enable a user to modify metadata in a shell browser. The selected panel 1000 includes a preview panel 1002 which contains a preview control 1004, a metadata display 1006 and a task control 1008. The selected panel 1000 also includes a view area 1010, in which multiple files or other items 1012 may be viewed. The metadata control 1006 and the task control 1008 may be omitted if desired.

The context menu 1014 in FIG. 10 presents the user with several options, including the choice of selecting either the default previewer or an alternative previewer for the selected item. The generic text shown in the menu 1014 is of course merely one example of the type of options which may be presented to a user for selecting a previewer. A context menu can be provided in any panel, including a welcome pane, to improve the user experience. As those skilled in the art will appreciate, any number and variety of context menus could be supported by the present invention. One means for enabling user selection of a previewer within a shell browser is to provide a context menu such as context menu 1014. A user may summon the context menu, for example, by clicking on the corresponding text or object in the preview panel.

Means other than context menus may be offered for selecting a previewer for the displayed items from a plurality of available previewers within a shell browser. One such means is for the user to click on the preview control to enter a selection mode. Similarly, the user may be prompted to select a previewer by right-clicking within the preview panel. By contrast, a user could enter a selection mode by hovering over relevant text or over a relevant object in the preview panel. Numerous alternative means are available and within the scope of the present invention.

FIG. 11A is a flow diagram illustrating a method 1100 for enabling a user to select a previewer in a shell browser which supports multiple item. The method 1100 provides a plurality of previewers in the shell browser at 1102. The plurality of previewers may include a default previewer for multiple item types and one or more alternative previewers for particular item types. These alternative previewers may include installed applications developed by a third party. At 1104, the method 1100 presents the user with a choice of two or more previewers for a particular item type. The prompt to select a previewer may be initiated by the shell browser (e.g., upon displaying a new item type) and/or by the user (e.g., by clicking on an object to display a context menu). Upon receiving an input from the user at 1106 indicating a selection of one of the previewers for the particular item type, the method 1100 then associates the selected previewer with the particular item type at 1108. The selected previewer will remain in use until the user selects a different one. However, if the selected previewer is an installed application, uninstalling the application may, if desired, terminate the use of the selected previewer.

FIG. 11B is a flow diagram illustrating a method 1110 for automatically selecting a previewer in a shell browser which supports multiple item types. The method 1110 provides a plurality of previewers in the shell browser at 1112. The plurality of previewers may include a default previewer for multiple item types and one or more alternative previewers for particular item types. These alternative previewers may include installed applications developed by a third party.

At 1114, the system (as opposed to the user) automatically and transparently selects a default previewer from two or more available previewers for a particular item type. The system may select a previewer in response to an event such as display of a new item type or the presence of an alternative previewer. The system is configured to select a default previewer based on logical rules. Under exceptional circumstances, the system may decide at 816 to override the rules and select a previewer that would not have been selected under the applicable rules. For example, if the rule is to select a newly available previewer over the current default previewer, an installed application may generally have the authority to change the default previewer to the previewer now available from the installed application. However, the shell browser, for example, may reserve the right to override the change proposed by the newly installed application. For instance, an override may be appropriate when the newly installed application cannot be authenticated as a proper owner of the item type in question.

In any event, the method 1110 then associates the selected previewer with the particular item type at 1118. The selected previewer will remain in use until a different one is selected. However, if the selected previewer is an installed application, uninstalling the application may, if desired, terminate the use of the selected previewer.

Figure 12:
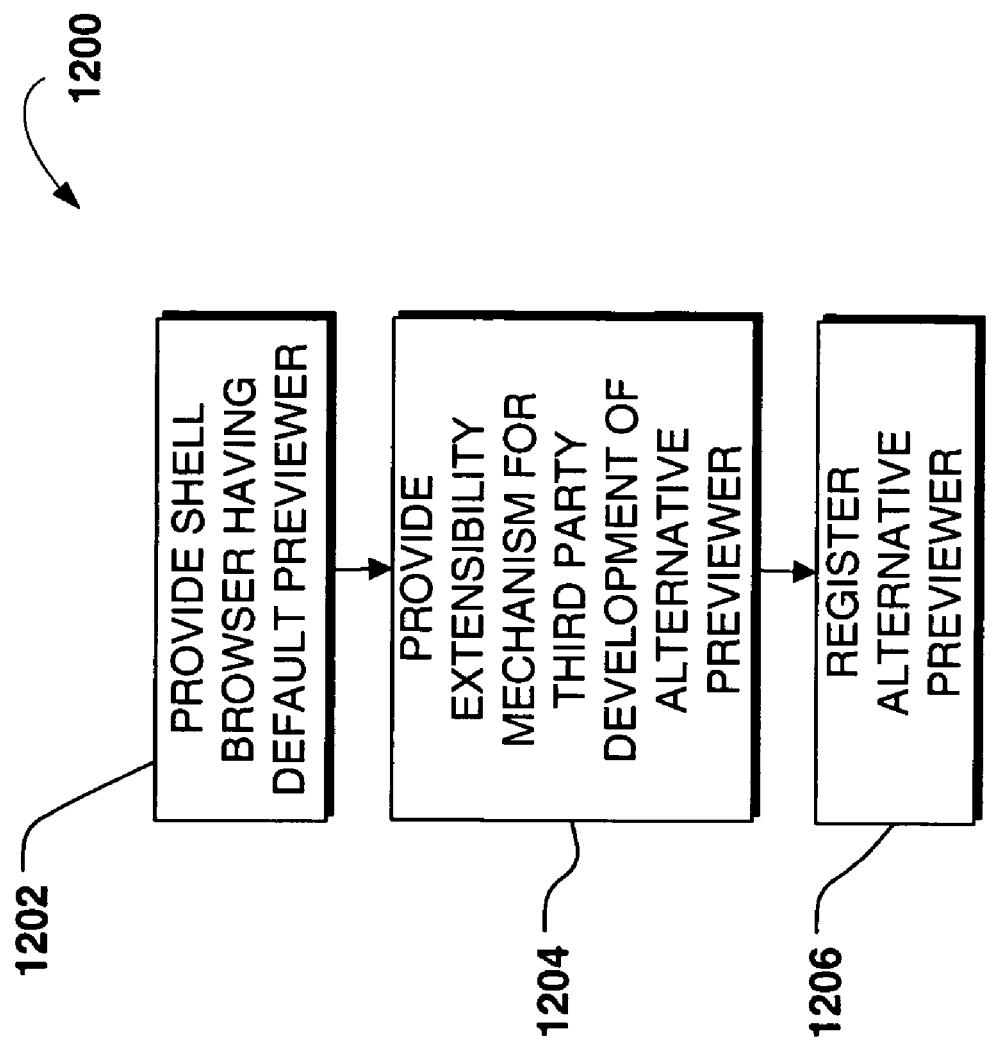
FIG. 12 is a flow diagram illustrating a method for enabling the use of third party previewers in a shell browser.

Referring next to FIG. 12, a flow diagram illustrates a method 1200 for enabling the use of third party previewers in a shell browser which supports multiple item types. The method 1200 includes providing a shell browser having a default previewer for the multiple item types at 1202. The method 1200 further includes providing an extensibility mechanism for third party development of an alternative previewer for at least one of the multiple item types at 1204. The alternative previewer may be registered in the shell browser at 1206. In the case of an installed application, registration may occur substantially at the time of installation. For example, if the application is installed by an OEM, the alternative previewer may be registered before the user has acquired the computer. Alternatively, the user may install the application locally or remotely.

There are many possible approaches for the extensibility mechanism referenced above in 1204. One such approach involves exposing a set of application program interfaces (APIs) so that independent software vendors (ISVs) and other third party developers may develop alternative previewers. With the API approach, a registration mechanism exists which allows an ISV to associate their preview control with an item type owned by the ISV. When an item or file of that type is selected in the shell browser, the ISV's preview control is instantiated via this registration mechanism and the extensibility API. The API provides data to the preview control: data representing the selected item(s) in the view and data representing the parent container of the items in the view. The preview control operates on this data and provides a user interface through the API which is presented in the shell browser. The user may provide input with keystrokes and mouse events which are passed by the shell browser to the preview control which can operate on those user input events.

Those skilled in the art will appreciate that many approaches are possible in the context of the extensibility mechanism. In addition to the API approach, similar functionality may be achieved via user configuration, a pointer to HTML or hosting a flash. Moreover, the extensibility model may require that only one application that owns the item type selected may provide only one alternative previewer. In other words, the number of available previewers may be limited to a default previewer and one alternative previewer to avoid a poor user experience in which multiple registered, extended previewers are in competition with one another. However, another model would be to allow any application that can handle the selected item type to provide one additional previewer. An alternative model would allow any running code to provide one additional previewer for any item type. It may also be desirable under certain circumstances to allow replacement or removal of the default previewer.

Figure 13:
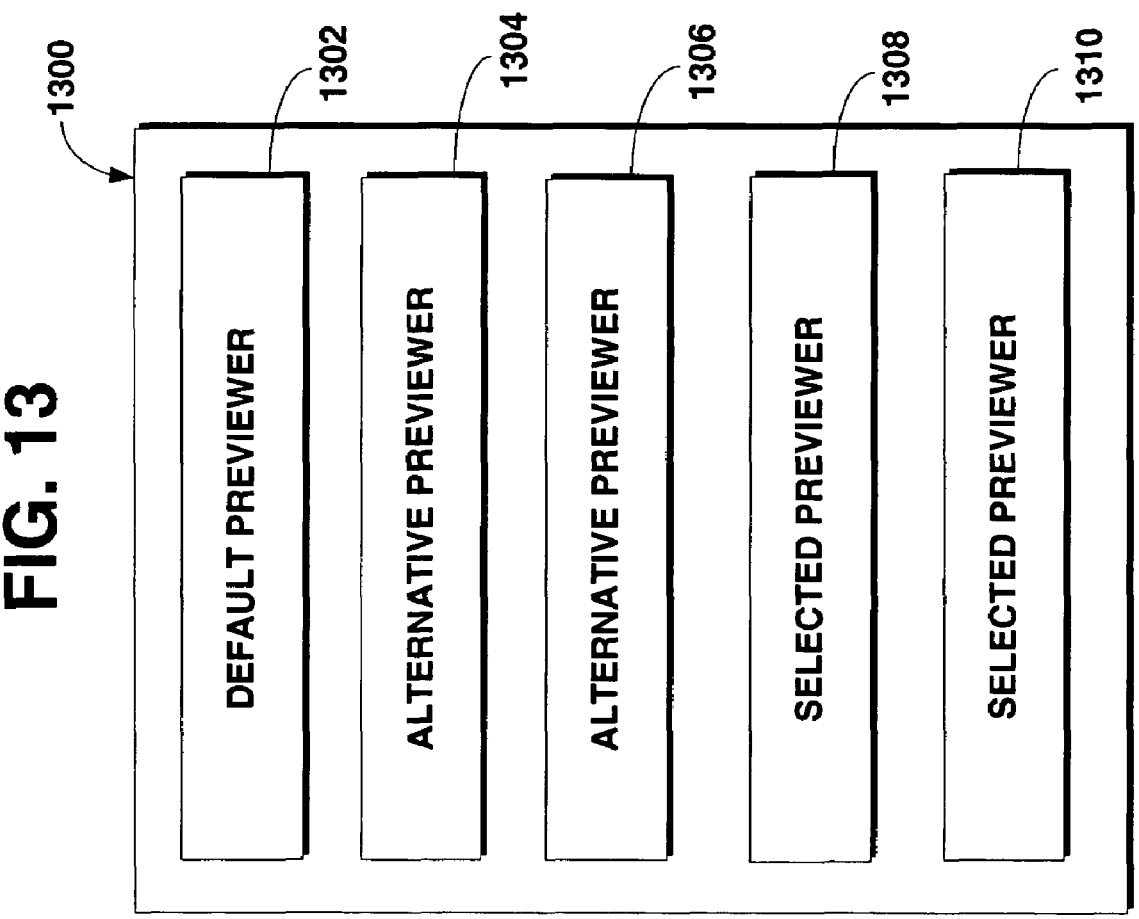
FIG. 13 is a block diagram of a data structure containing information indicative of multiple previewers in a shell browser.

FIG. 13 is a block diagram of a data structure 1300 which is stored on one or more computer-readable media and which contains information indicative of a plurality of previewers in a shell browser. The data structure 1300 includes a default previewer field 1302 containing information indicative of a default previewer which supports multiple item types. An alternative previewer field 1304 contains information indicative of an alternative previewer for a first item type. Another alternative previewer field 1306 may contain information indicative of a second alternative previewer for the first item type, or it may contain information indicative of an alternative previewer for a second item type. Those skilled in the art will appreciate that in some cases there may only be one alternative previewer field, and in other cases there may be two or more alternative previewer fields. The selected previewer field 1308 contains information indicative of whether to invoke the default previewer or an alternative previewer when items of a particular item type are displayed in the shell browser. In the event that field 1306 contains information indicative of an alternative previewer for a second item type, a selected previewer field 1310 may contain information indicative of whether to invoke the default previewer or the alternative previewer when one or more items of the second item type are displayed in the shell browser. The information contained in fields 1302, 1304 and/or 1306 may comprise the previewer code which is configured to run when a user selects an object of that type.

Figure 14A:
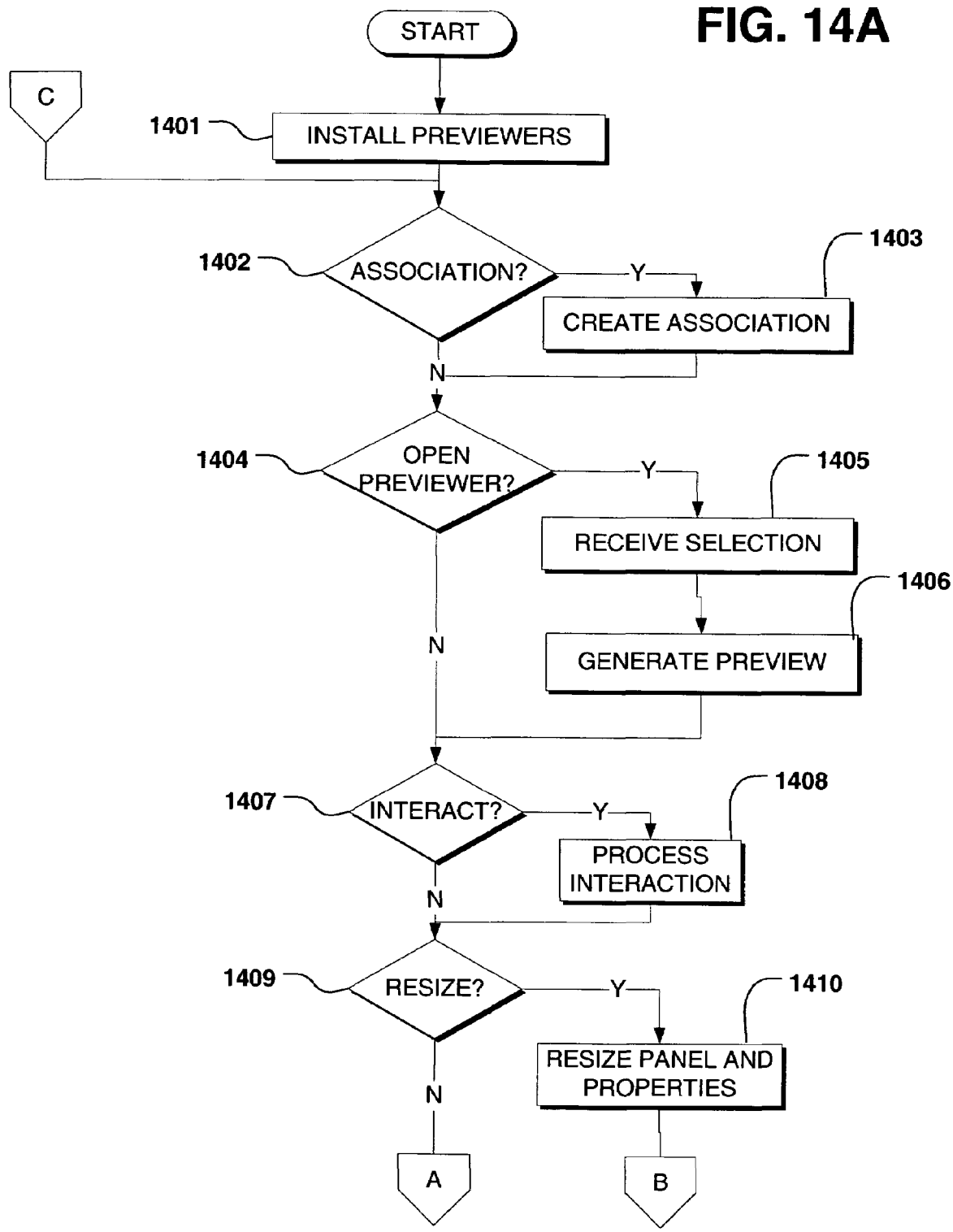
FIGS. 14a–b depict an example flow diagram of a process that may employ features described herein.
Figure 14B:
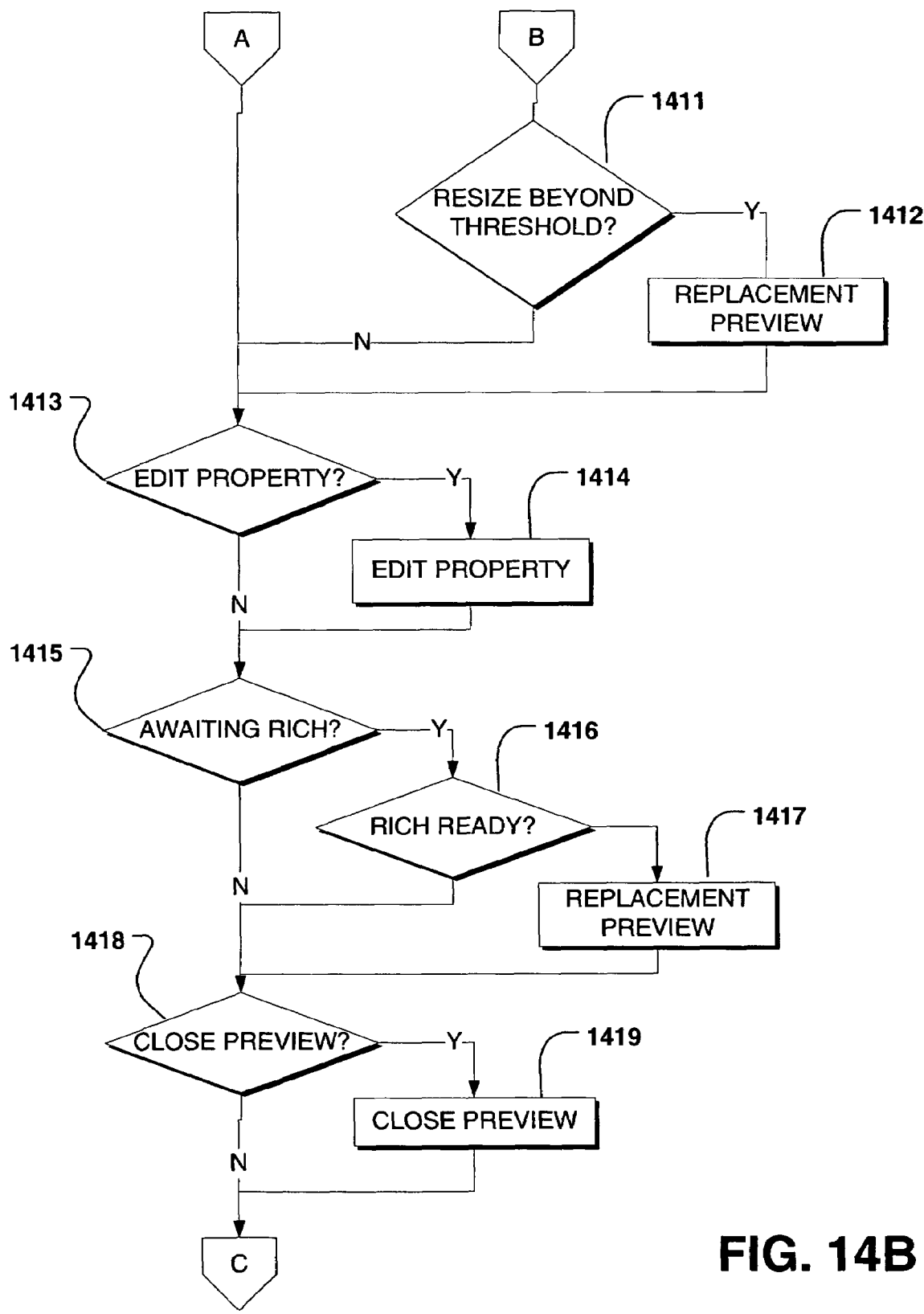

FIGS. 14A–B depict an example flow diagram for a preview process that may be used in conjunction with the features described above and herein. As an initial step in the process, one or more previewers may be installed on the system in step 1401. Previewers may be software that is shipped as part of the underlying operating system software. Previewers may also be additional software loaded onto a computer system after it is shipped. For example, the underlying operating system may expose a set of application program interfaces (APIs) that would allow future development and/or addition of previewers.

In step 1402, a check may be made to determine whether a new association is to be created for one or more previewers. An association may be any criteria and/or request governing the times and types of previewers that are to be used. An association may be created to define the types of previewer(s) to be used for a given user identity (or if a particular user wishes to disable previews altogether), and/or for certain predefined situations based on system conditions (e.g., available resources, memory, current applications running, number of previews generated or to be generated, available power, time of day, status of other applications, etc.) and file type (e.g., a user may prefer to use one type of previewer for home videos, and a different previewer for compressed songs), such that the default previewer used by the system may be user-defined. A user may indicate that certain file types are only to have basic/non-interactive previews, or the system can automatically disable a preview if it experiences a predefined number of failures, crashes, or hangs. An application may be associated with one or more previewers so that previews opened from the application, or previews of files created by the application, may always be previewed using the same previewer. These associations can be hierarchical in nature, such that multiple previews are ranked in order of preference. The step of requesting a new association 1402 may occur at startup, upon installation of an application, upon execution of a predetermined application, and/or by user request.

If a request to create a new association is received, then the association is created in step 1403. The act of creating an association may be accomplished by querying the user for the specific criteria to be met when certain previewers are to be used, or retrieving such criteria information automatically from an application and/or the system itself. When created, an actual association can take the form of data stored in the computer system's memory associating the previewer(s) with any of the criteria identified above.

In step 1404, a check may be made to determine whether a previewer needs to be opened. There are a number of events that can trigger the opening of a previewer. For example, when a user opens a shell browser on the system and begins perusing files and/or folders, the browser may initiate a previewer to display a preview of one or more selected files (or default files, when none is selected). Alternatively, a previewer may be triggered at the request of any other application. A previewer may also be triggered by the creation of common file dialogs that are shared by multiple applications. Common file dialog previews are discussed further below.

If a previewer is to be opened, the system may receive the selection, or selections, that are to be previewed in step 1405. This may involve receiving identifications of the file (or files) that are to be previewed. Such selections may be made by the user, such as by the selection of one or more files by moving a mouse pointer to a listed file and pressing the left mouse button, or clicking and dragging a selection box around multiple file listings. Alternatively, selections may be made automatically. For example, certain applications may default to a predetermined file, and may automatically select that file for previewing upon first opening. A word processing program, such as MICROSOFT WORD™, may default to a previewer that includes text editing features. The system may automatically select files for previewing as a result of conducting a search. A user might enter search criteria, such as a keyword, and the system or application may automatically select one of the search results for previewing. For example, a user might type in "peanut" as a keyword in a system search tool, and the resulting listing of files containing "peanut" may display, with a preview of the first listed file.

Once the file(s) to be previewed are selected, the system then selects and generates the appropriate preview in step 1406. Selecting an appropriate preview may be based on one or more associations that have been created (e.g., a user has selected a particular previewer for previewing all files of a certain type, or for previewing certain files), and may also be based on the system resources that are available (or consumed). Alternatively, the user may be requested to identify which previewer should be used for the current preview by, for example, selecting from a presented list of predetermined previewers that may be appropriate for the selection to be previewed.

In some situations, it may be desirable to generate an initial basic preview that can be viewed while a richer interactive preview is being initiated. For example, if a rich preview of a text document would require a few seconds to load and generate, the user may be presented in the interim with a more basic preview that can be generated sooner. The more basic preview may have some, or none, of the interactive functionality offered in the rich preview, and can at least get the user started in previewing the selection(s).

Selecting a preview may include a prestored sequence of previewers that can be used. For example, a particular application or view may have a hierarchical sequence of available previewers, such as a full rich previewer, a reduced feature previewer, a basic thumbnail preview (which need not be interactive), and a basic icon similar to the desktop icons currently used in MICROSOFT WINDOWS™ operating systems. When a previewer is to be opened, the system may start with one previewer, such as the full rich previewer, and "fall back" through the sequence of previewers to find the most appropriate one. For example, the full rich preview might be the default for a particular view with a previewer that offers paging, zoom and text editing capabilities that allow the user to modify the document from the preview, and if there are insufficient system resources (e.g., due to memory limitations, other applications, other previewers, etc.) to adequately offer that preview, the system may check the next previewer (e.g., a less-featured one) on the list. The next previewer may be slightly less featured, for example, by only offering the ability to navigate through (e.g., paging and zooming) the document, but without the ability to edit. Such a previewer may require less system resources to run, and may be preferred if resources are not available. If there still are insufficient resources to offer that second previewer, the system can check the next previewer (e.g., a basic thumbnail view with little or no interactivity), and so on until a suitable previewer is found given the available resources.

When the preview is generated, the preview may be initiated as a separate and distinct process from the application requesting the preview. For example, if a previewer is provided in a system shell browser, the previewer may be executed as an independent process from the shell browser. With the preview as a separate process, the shell browser might not ever find itself in a position of having to wait for a response from the preview application, thereby avoiding a crash or hang if the previewer encounters difficulty. Such difficulty can come from a variety of sources. The selected file might have corrupt data such that the preview application cannot process it; the preview application itself might have an error or bug preventing its smooth operation; the file may be mislabeled or misidentified such that the wrong preview application is chosen (e.g., the file may indicate that it is an audio file, when actually it is a text file); or the system resources may encounter a problem such as a bad memory sector. Having the previewer as a distinct process provides a degree of crash/hang resistance. If the previewer encounters an error, crashes, or hangs, the problem will be confined to the preview panel itself, and the shell browser will continue to function. In some instances, the system may keep track of the number of times that a particular preview application encounters difficult, crashes and/or hangs, and if a predetermined number is exceeded (e.g., 3), then the system may take steps to reduce the frequency with which that particular previewer is used. For example, the system may lower the priority of that previewer, or create an association that calls for a different previewer.

In step 1407, a check may be made to determine whether the user has interacted with any displayed preview. Interaction can take any form of known computer interaction. For example, an interaction may be a mouse click within the preview panel. An interaction may be a selection of one or more graphical interface elements in the preview panel, such as paging buttons cursor arrows, or the like. Interaction may take the form of keyboard keys, such as cursor movement keys to move a cursor within a preview of a text document.

If an interaction occurs, the appropriate processing will occur in step 1408. Processing an interaction may take the form of any response to a user input. For example, the processing may begin an editing process in response to a user clicking a mouse or other pointer within the preview panel. The editing process may allow the user to view and/or edit the previewed file directly from the preview panel, without requiring the user to leave the view having the preview panel.

In step 1409, a check is made to determine whether the preview panel has been resized. The panel may be resized, for example, by the user entering commands, and/or by clicking and dragging a boundary or resizing tool of the preview panel. If the panel is resized, the new resized panel is displayed in step 1410. If desired, the resized panel may be configured to automatically retain the same aspect ratio found in the original panel. Some file types may be configured, such as through association, to always have the same aspect ratio (e.g., videos may always be 4:3). If properties or metadata were displayed accompanying the preview, then the properties and/or metadata display area may also be resized to correspond to the new preview panel size. For example, the properties or metadata display area may be configured to always have the same height or width as the preview panel. Conversely, the previewer may be resized in response to a resizing of the properties/metadata display area. If desired, the new size may be stored in the system as the new default size associated with the particular file type, current view, application, and/or user, and used the next time a preview is needed.

In step 1411, a check may be made to see whether the new size of the preview panel has passed one or more predetermined thresholds for the preview. As noted above, previewers may have one or more criteria for their use. One such criterion may relate to the amount of display area available to the previewer. For example, different levels of interactivity and/or functionality may be offered for different sizes of preview. Using a word processor, such as MICROSOFT WORD™, as an example, a larger preview may offer more detailed functionality, such as navigating/paging and zooming in the document, changing font size, or editing text using a cursor in the preview, while a smaller preview of the MICROSOFT WORD™ document might still include the navigation and zooming features, but omit the cursor text editing if the display is too small to reasonably use a cursor to edit the text. A previewer may have one or more threshold sizes associated with it, which may be created during association, stored in the computer system's memory, and which may identify a replacement previewer for use when the threshold is met or passed. For example, the previewer might require a minimum of 256 pixels of width to implement certain features, while other features might only be included if there are 512 pixels.

If the new size passes a threshold, such as a minimum or maximum threshold, a replacement preview may be selected and generated in step 1412. The generation of a replacement preview may be identical to the generation of the preview in step 1406. So for example, if a preview panel has been reduced in size beyond a certain minimum size, a replacement previewer may be used that offers a smaller subset of those interactive features that can still be used at the smaller size. Alternatively, if the preview panel has been enlarged beyond a certain maximum size, a replacement previewer may be used that offers more features that can be useful given the larger size, such as a previewer that has more user interface controls, or allows detailed edits within the preview.

In step 1413, a check is made to determine whether a displayed property, or piece of metadata, is to be edited. Such data may be edited by, for example, clicking a mouse or pointer on a piece of displayed metadata, and entering a value using a text entry or menu user interface. In step 1414, the appropriate steps are taken to edit the particular property. The actual steps may depend on the type of data being edited. A date field may bring up a calendar user interface element, allowing a user to view and select a date (and/or time) value for entry. Other types of data may be entered through a text entry box, and other types may be selected from a menu, such as a pull-down menu.

In step 1415, a check is made to determine whether the system is awaiting the loading of a rich previewer. As noted above, a more basic or generic preview may be provided while a rich preview is being initialized on the system. If the system is awaiting a rich previewer, in step 1416, a check is made to determine whether the rich previewer is ready. If it is, then the system will replace the existing preview with the rich preview in step 1417. Step 1417 may also include a query to the user to determine whether the rich previewer is still desired. Although this step shows two previewers, more than two may also be used. For example, the system may display an icon while waiting for a thumbnail preview, and then display the thumbnail while waiting for a rich preview, etc.

In step 1418, a check is made to determine whether a previewer is to be closed, and if so, the previewer is closed in step 1419. Then, the process returns to step 1402 to begin again. Of course, the process shown in FIGS. 14*a–b* is merely an example showing a way of arranging a number of steps, and any of the steps may be reordered, repeated, removed, or modified as desired to implement (or remove) any feature described herein.

Figure 15:
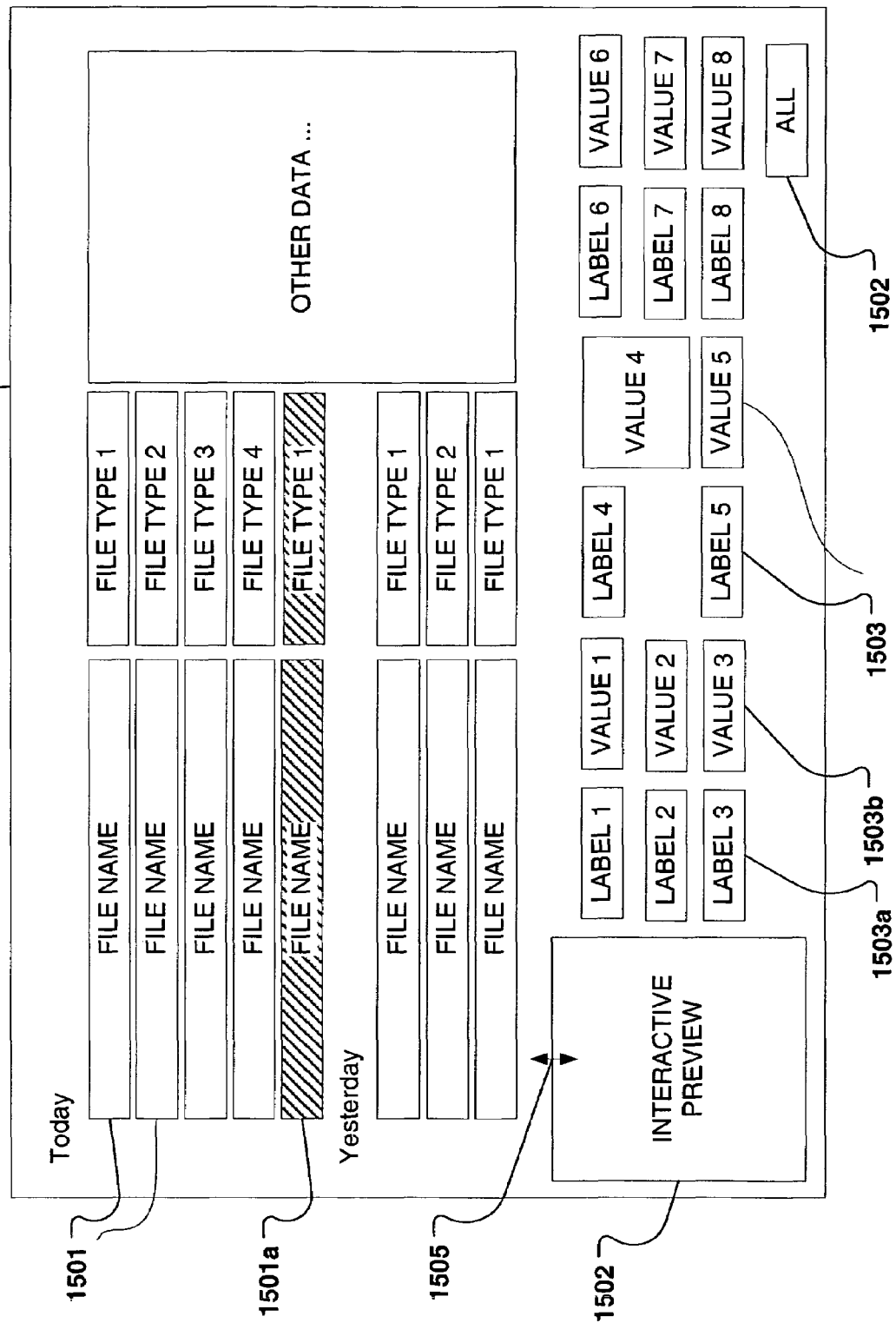
FIG. 15 depicts an example file browser user interface and various user interface elements.

FIG. 15 is an example of another shell browser interface 1500 (or system browser) incorporating one or more aspects of the present invention. Browser 1500 may be offered as part of the operating system for viewing contents of one or more directories, networks, drives, folders, etc., and may be generic, or non-application-specific. In browser 1500, a number of items 1501 are listed, with file name, file type and other data being listed for the various items. As shown in this example, files of multiple different types (e.g., text files, image files, audio files, and/or custom data files for existing applications, such as word processing applications) may all be displayed in the shell browser. The items 1501 are shown organized by date (e.g., Today's and Yesterday's files), but any sorting or organization may be used (e.g., file size, file name, project name, file type, artist, album, create date, edit date, etc.). The user may select one of the listings, such as listing 1501a (shown as visually differentiated with a first pattern which may be the color red), and the shell browser 1500 may display an interactive preview panel 1502 corresponding to the selected item 1501a.

Interactive preview panel 1502 may, for example, display one or more pages of text appearing in selected item 1501a when item 1501a is a file containing textual data, such as a MICROSOFT WORD™ file, or other word processing program. The interactive preview 1502 may allow the user to edit and/or manipulate the displayed text directly in the preview panel. For example, the user may be permitted to click a mouse pointer within the interactive preview 1502 to cause a cursor to appear in the panel, and the user may manipulate the cursor or enter keyboard inputs to add, delete, and/or otherwise modify the displayed text. Other types of controls, such as paging controls, font/format controls, scrolling controls, file management controls, input/output controls, and the like may also appear in the preview panel 1502.

Different types of data files may have different types of interactive previews. For example, the interactive preview for an audio file might include controls to control the play of an audio preview of the selected audio file on one or more speakers (such as speakers 197) of the computer system. A preview of a .wav file or .mp3 file may include such audio commands. There may be controls to play, pause, or cue the playing of the audio file. Some previews, such as previews of pictures, may include zooming/panning controls to allow the manipulation of a displayed image. Video previews may have controls to play, pause, or cue the playing of a video on a display and audio on a speaker of the computer system.

The interactive preview 1502 may also be displayed in conjunction with a plurality of properties 1503 (including metadata), shown in FIG. 15 as having labels 1503a and corresponding values 1503b. Any type of file property may be displayed with a label. Example properties may include file size, folder location, file name, project name, edit/create date, application type, etc. The various labels and properties 1503 that appear may be customized according to the type of file chosen, so that different sets of properties may appear for different types of files, depending on what is appropriate for the selected file's type. For example, a selected audio file containing a song may have properties for album name, artist, name of song and release date, while a selected spreadsheet file might replace those properties with different properties, such as group name, project name, project leader and project start date. The determination of which properties are to be displayed may be automatically configured, or alternatively the user may be given the option of selecting (and/or deselecting) properties to appear in the properties area for a particular file type. Properties may be prioritized by type (e.g., an "album name" property type may be more important to a song file than an image file) to facilitate in this display.

Other variations on the displayed information are also possible. For example, some labels (such as file name and file type) may be considered optional, or may be omitted from the display altogether. One example from FIG. 15 may be the file name and file type, which is already displayed elsewhere on the screen, and would be redundant if displayed again in the properties area by the previewer. The space available for such non-displayed labels might be used to display additional property information. Properties having no value may be omitted by default, or may be flagged to appear despite being empty. As another variation, some properties may be provided with different amounts of space to accommodate more lengthy properties.

The properties may be editable from the property display area. For example, a user may simply click on, or hover over, a displayed property value, and begin a process of entering/editing data. The interface for entering/editing the data may be dependent on the particular property or type involved. Some properties, such as dates, may have a calendar display and/or pull-down menu to select a value. For example, the user can simply move a mouse pointer over a date field, and a display of a calendar can appear to help the user enter a date by choosing from the calendar. Pull-down menus or lists of possibilities may be displayed to simplify entry. For example, by clicking a mouse pointer on a month field, the system may display a list of months from which the user can choose to fill in the field. A simple textbox may be displayed with a cursor to allow the user to directly type in and/or edit the property value form the preview display, without requiring a separate dialog box for the data. The textbox may be a fill-in-the-blank box in which the user can type using a cursor and keyboard. Any other form of data entry may be used. To help the user identify properties that may be edited, those properties may be visually differentiated or accentuated in some fashion in the display. For example, a different color (e.g., yellow), font (e.g., bolded letters, or ALL CAPS font), appearance and/or symbol may be used to indicate values that are editable by the user and values that are not. Highlighting can also be used to differentiate or accentuate certain fields. For example, editable fields may have a certain color (e.g., canary yellow) in and/or surrounding them, similar to the effect created when a yellow highlighter is used on a printed document.

Some file types may have more properties than what will fit in a given preview display. In some embodiments, there may be an option, such as an ALL button 1504, that may allow a user to view all properties for a given file, or at least view additional properties.

As noted above in step 1409, the user may be given the option of resizing the preview and/or properties display used in the browser 1500. For example, a resizing tool 1505 may be used in the preview panel 1502, and by selecting and moving the tool, the user can cause the browser 1500 to automatically adjust the display area occupied by the previewer and/or properties area.

Figure 16:
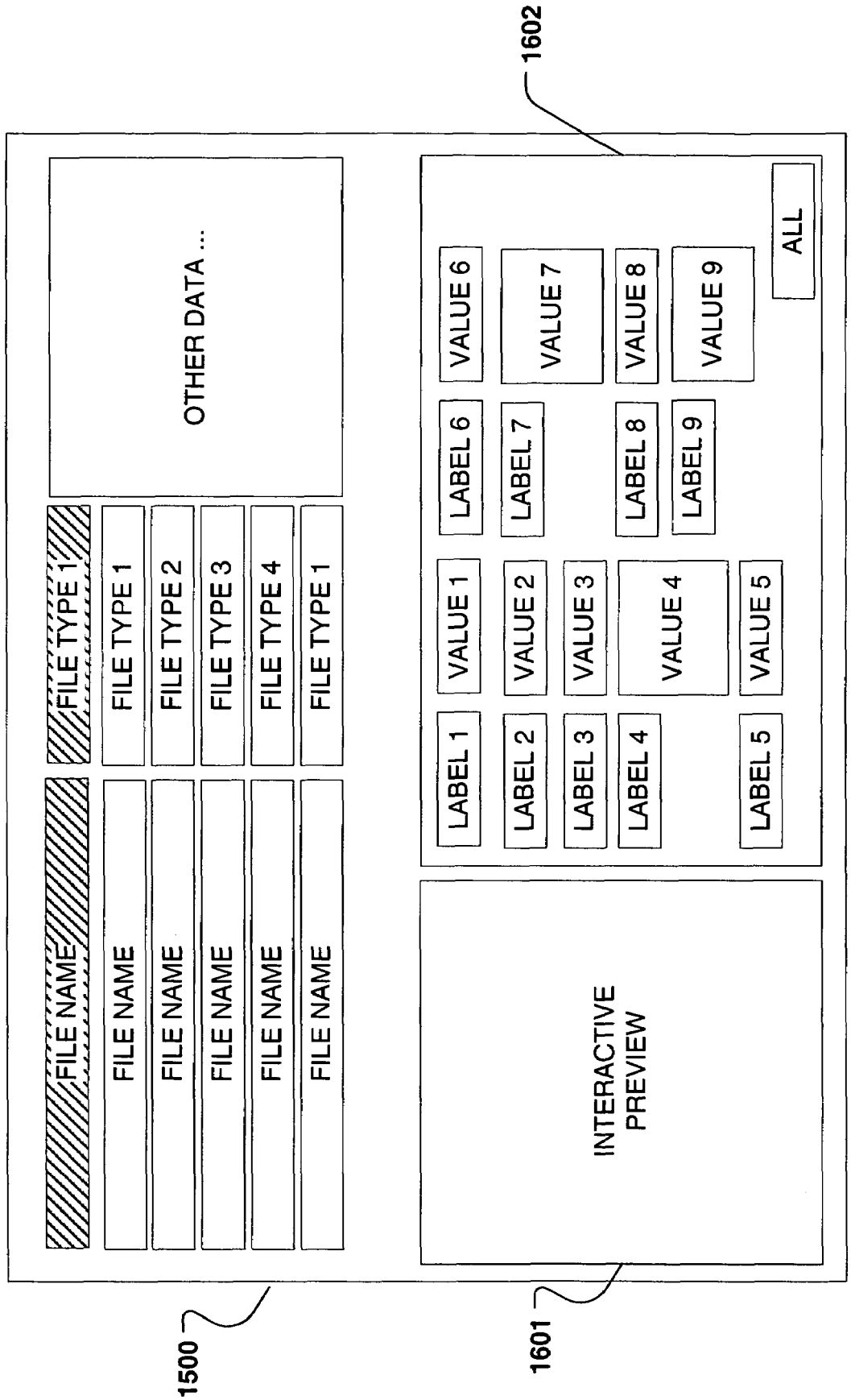
FIG. 16 depicts a modified version of the interface in FIG. 15, in which the preview area is resized.

FIG. 16 shows an example user interface in which the user has resized interactive preview 1502 to have a larger size, resulting in larger interactive preview 1601. The new preview 1601 may be configured to have the same aspect ratio as the old preview 1502, or the user may be permitted to modify the aspect ratio as part of the resizing process. With a larger preview 1601, the browser 1500 may increase the space allocated to the display of properties as well, so that the properties and preview correspond in size. For example, the properties area 1602 may be configured to have the same height as the resized preview, and may automatically rearrange the displayed data to accommodate the new size. Additional properties may be displayed in this larger area.

As noted above, a change in the size of the preview may, in some instances, cause a change in the type of preview offered, such that different sizes of preview panels result in different types of interactive preview. So preview 1601 may differ from preview 1502 in terms of the level of interactivity and/or the types of features provided. As one example, certain graphic editing features might not make sense if the preview is less than 256 pixels in width. The same type of resizing can occur if the user resizes the area used to display properties. For example, the user could click and drag a mouse pointer on a border of the properties area 1602, and resize it, and cause the preview area 1601 to change sizes to match the new properties area 1602 size.

Figure 17:
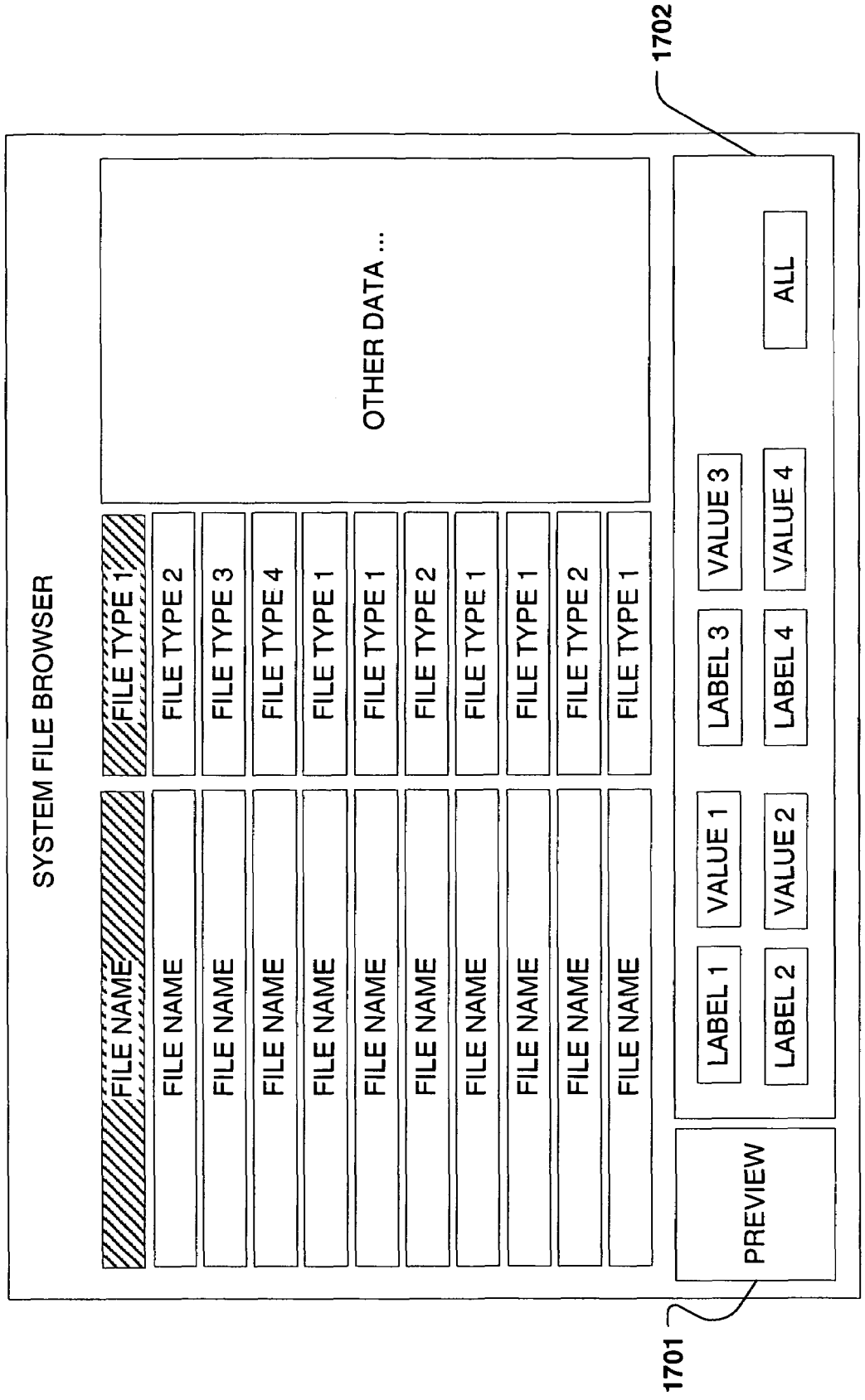
FIG. 17 depicts another modified version of the interface in FIG. 15, in which the preview area is resized.
Figure 18:
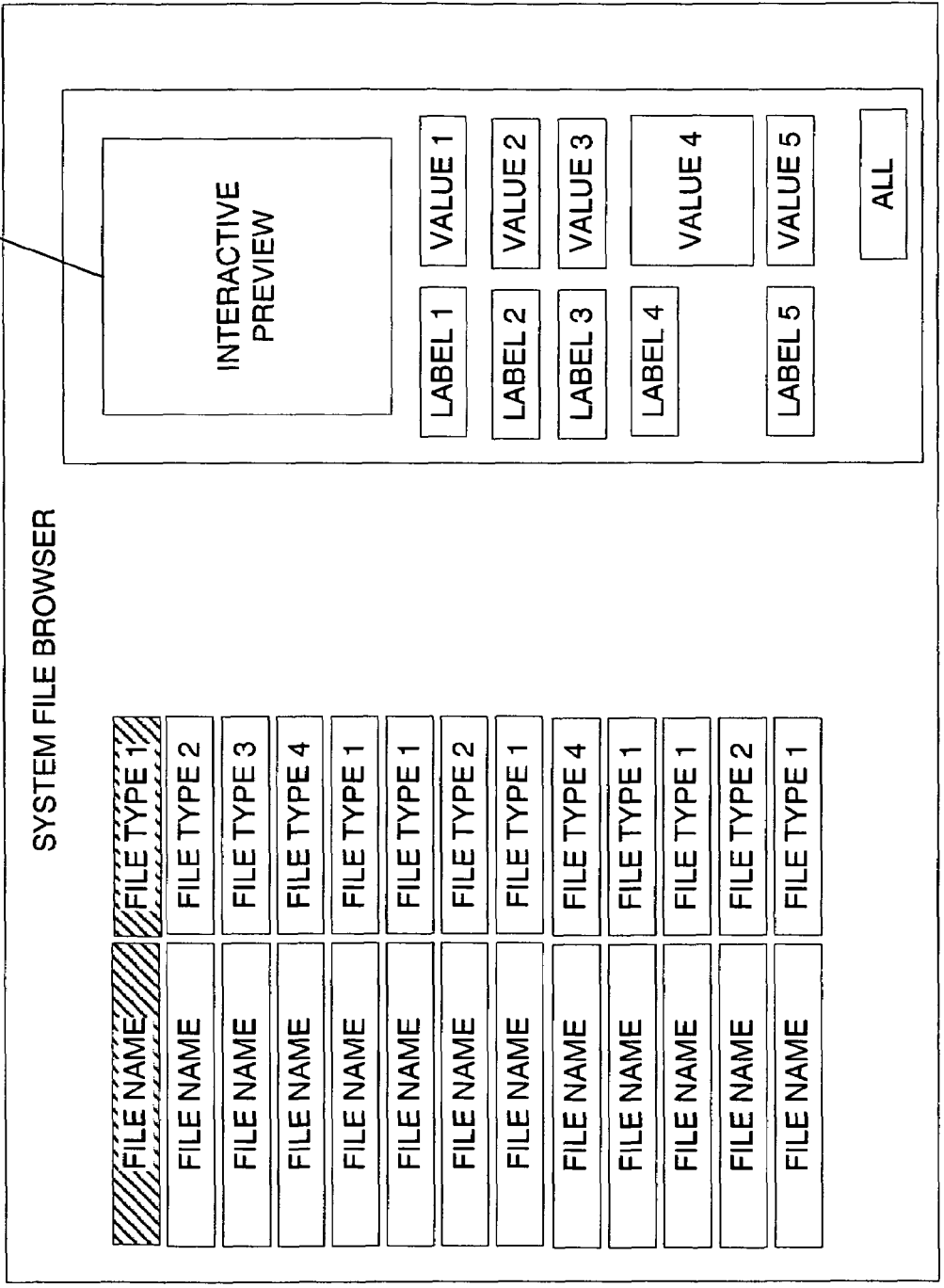
FIG. 18 depicts an alternative browser interface with a different orientation of preview elements.

FIG. 17 shows an example in which the preview has been resized to be a smaller preview 1701. Smaller preview panel 1701 may have a reduced set of features given its smaller size. Properties area 1702 may also be reduced in accordance with the preview panel 1701, and may rearrange and/or remove displayed properties or metadata to accommodate the reduction in available space. Some previews may exhibit icon behavior found in the Microsoft WINDOWS™ operating systems, so that right-clicking, left-clicking, dragging, etc. may have the same effect. For example, dragging and dropping one icon onto another may cause a first file to be attached to the second.

In addition to resizing the preview panel and/or properties display area, these elements may be rearranged either automatically or by user request. For example, the user may wish to move (e.g., by selecting a preference, by clicking and dragging the preview, or some other user input) the preview 1801 to have a different orientation and appearance. A different orientation may be preferable when certain types of files are previewed. For example, previews of photographs taken in the "landscape" format, or of video images, may be more suitable to an orientation that is wider than it is tall (e.g., "landscape"), while other types of files (e.g., text documents, or "portrait" images) may be more suitable in an orientation that is taller than it is wide. The selection between the formats can also be done automatically, for example, based on file type. The system may, for example as part of the preview selection in step 1406 or association in step 1403, automatically examine the file type, properties, and/or metadata to determine which preview orientation would be most appropriate for the selection to be previewed.

To facilitate the rearranging, and the crash/hang resistance noted above for the preview panel, the preview panel and properties/metadata area may be implemented as separate software modules. Each module may be executed as a distinct process on the system's processing unit(s) 120. Alternatively, the preview and property/metadata panels need not be implemented as distinct software or software modules in the system, and may instead be implemented as a common module. The level of integration may be a design choice based on the level of extensibility desired, software memory footprint, and other factors.

Figure 19:
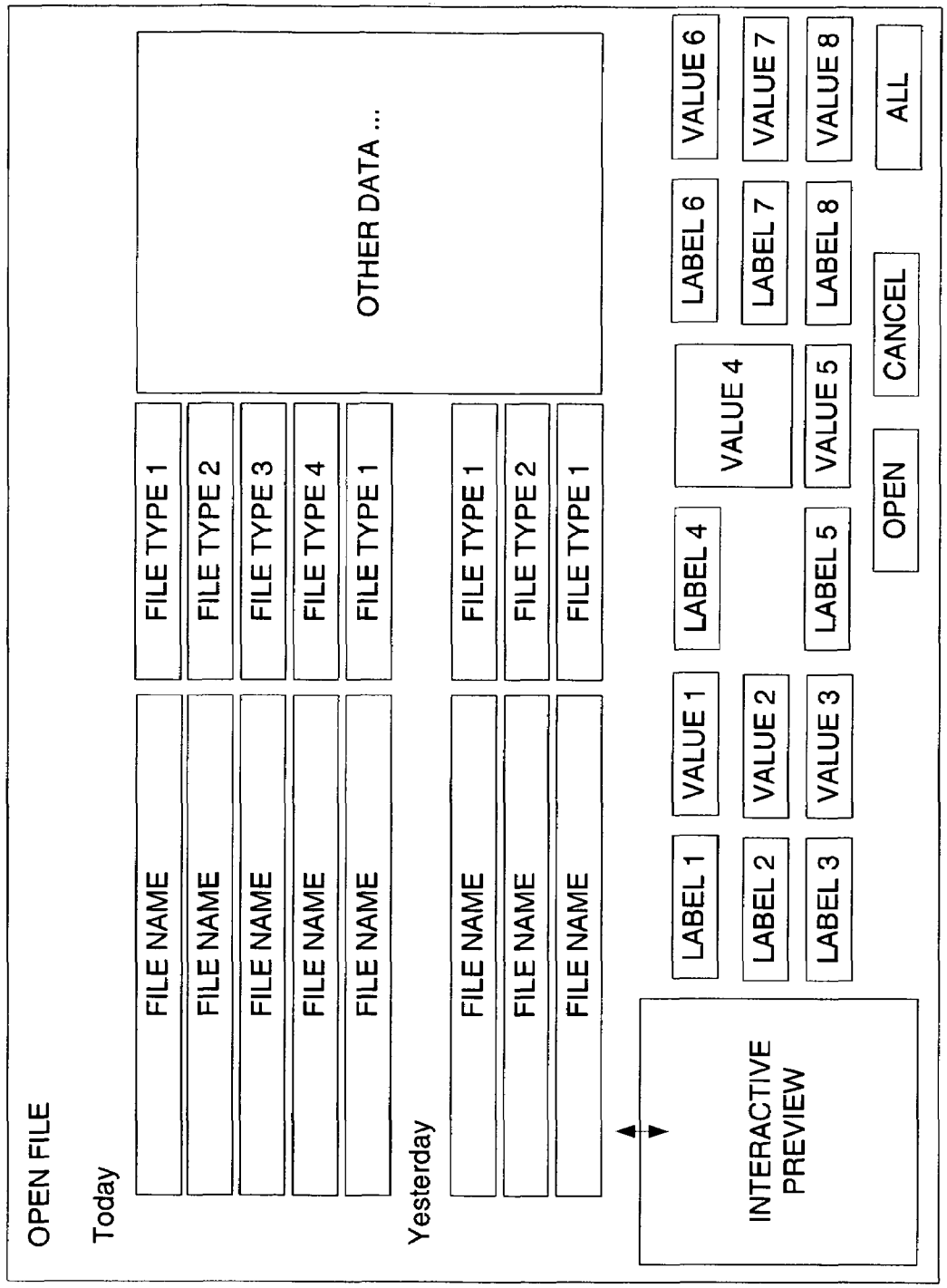
FIG. 19 depicts an example of a common file dialog that includes a preview interface.

As previously mentioned, the preview panel may be incorporated into a computer system's common file dialogs. Common file dialogs may be user interface elements and/or programs offered by the computer system to be shared by the various applications executed on the system. For example, an operating system might offer a common "Open File" or "Save File" dialog that may be used by any application wishing to create a file on the system. Including a previewer in such common file dialogs allows multiple different types of applications to benefit from having previews, and allows applications to effectively provide rich, interactive previews of files that are not natively supported without requiring the application developers to develop their own previewer. Incorporating a previewer in the common file dialog also provides a consistent interface across multiple applications, where user preferences and associations may be consistently used across the various applications. Furthermore, offering the previewer in the common file dialog may allow an application to effectively provide a rich, interactive preview of a diversity of file types—even file types that the application does not natively support. For example, a spreadsheet application may have installed its own rich, interactive previewer to handle previews of data-intensive spreadsheets. A separate word processing application, which might not have any capability for editing the spreadsheet application's data files, may nevertheless offer such a preview by using the common file dialog. FIG. 19 shows an example of a previewer that is part of an "Open File" common dialog. These common file dialogs, with their previews, may be extensibly offered to other applications through certain APIs.

In some instances, a user may wish to select multiple files at once, or have multiple files actively selected at the same time. In those instances, the previewer may operate as described above, providing separate previews for each selected file. Alternatively, the system may alter its behavior. For example, if, in step 1405, the system determines that multiple files are selected, the step of generating a preview 1406 may involve a process of determining which selected file will be previewed, and which ones will not. This determination may be made based on a variety of criteria (e.g., first selection, last selection, newest selection, largest selection, simplest preview, user previewer preference, etc.), such as the associations and preferences discussed above.

Figure 20:
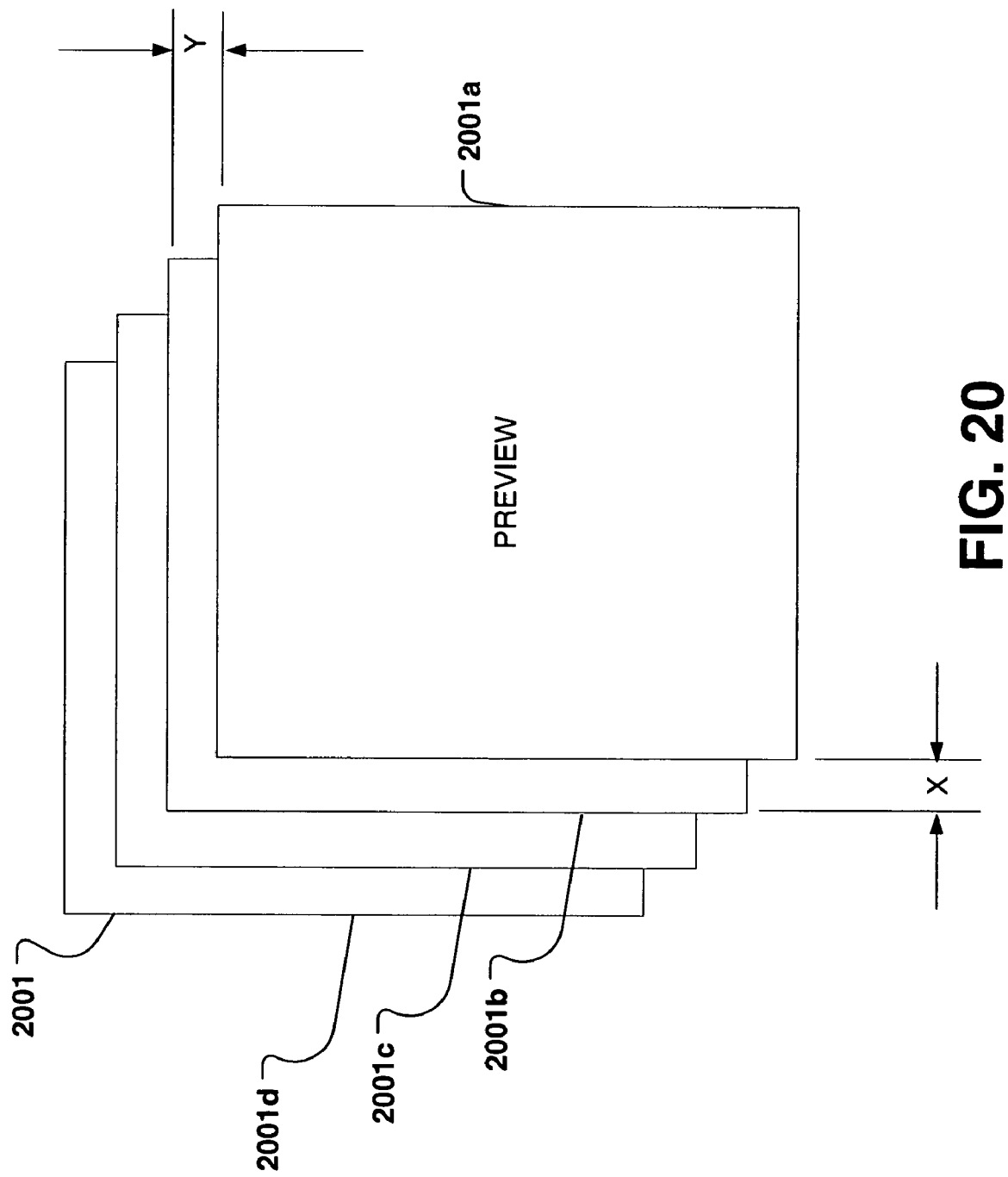
FIG. 20 depicts an example of a stacked preview presentation.
Figure 21:
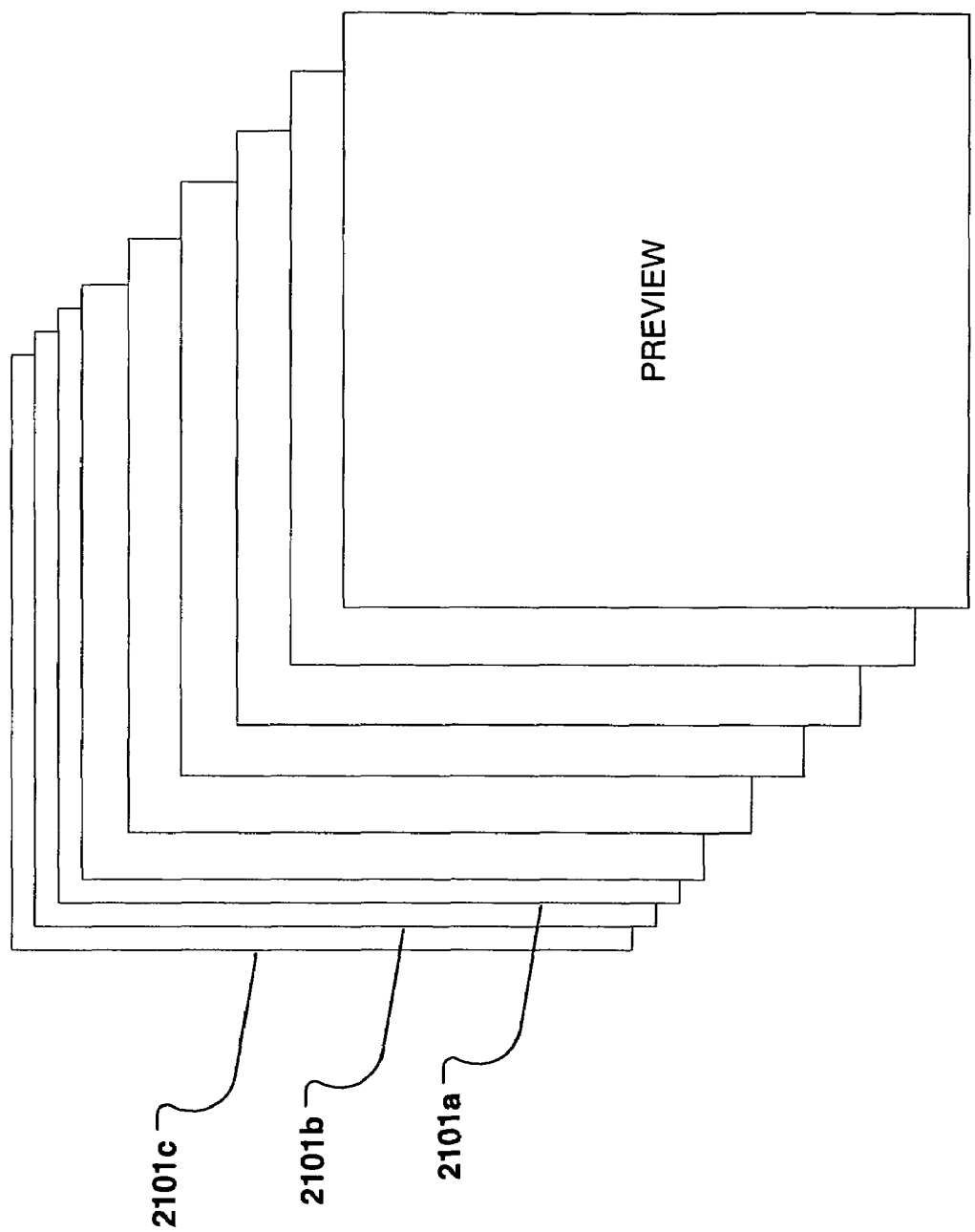
FIG. 21 depicts another example of a stacked preview presentation, having more stacked previews than the example shown in FIG. 20.

The system may also take steps to generate simultaneous previews corresponding to the multiple selections. As depicted in FIG. 20, multiple preview panels 2001 may be given a stacked appearance to illustrate the multiple selections being previewed. A primary preview 2001a may appear on top, and may have all of the same rich interactivity described above with other previews. Additional previews 2001b, 2001c and 200d for the other selections may appear stacked behind the primary preview 2001a, and may have horizontal offset X and vertical offset Y. The offsets may be constant to present a uniform appearance. Alternatively, the offsets for each successive preview may become smaller as more previews are placed in the background. There may be a predetermined maximum number of stacked previews, beyond which a different appearance may be used. For example, if the predetermined maximum number of previews is set to 6 (can be set by the system or by the user), and if more than 6 files are selected, the stacked previews may have a different appearance, as shown in FIG. 21. There, the previews 2101a, 2101b and 2101c beyond the first six (6) are shown as being stacked with smaller offsets. These additional previews may be rendered as simply blank previews, with a predetermined pattern, and/or with a degree of transparency or opacity to indicate to the user that there are more selected files that are not previewed.

Figure 22:
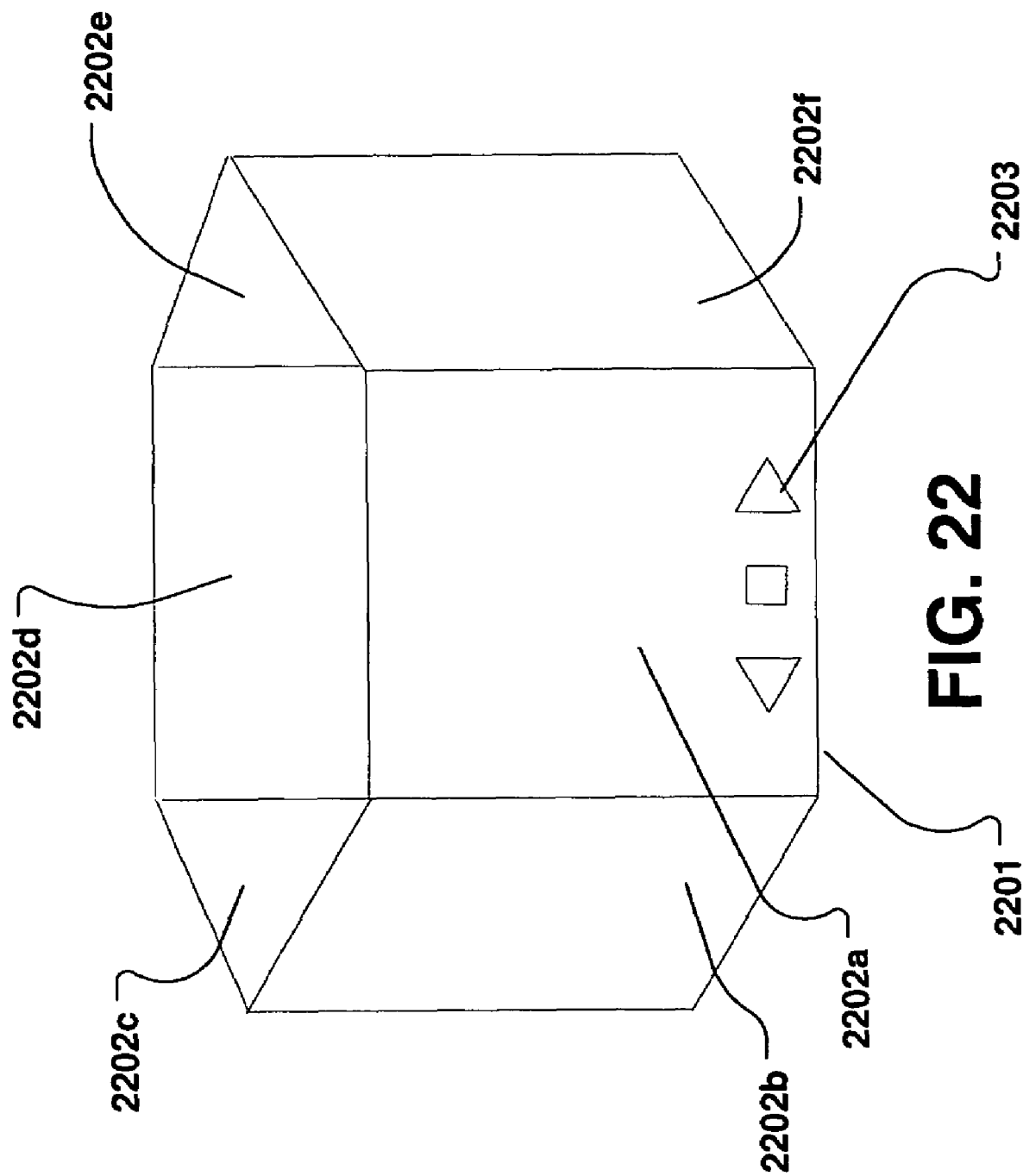
FIG. 22 depicts an example of a preview occurring when multiple files are selected.

Alternative displays of multiple previews may also be used. For example, a rotating 3-D carousel of previews, such as that shown in FIG. 22, may be used. The six-sided carousel 2201 may display six separate previews on its different faces 2202*a*, 2202*b*, 2202*c* (shown from back), 2202*d*(shown from back), 2202*e* (shown from back) and 2202*f*. User interface elements 2203 may be provided to allow manual navigation through the carousel, such as rotation or zoom, or carousel may be rotated automatically (or not at all). Other approaches include displaying multiple previews in a fanned-out display, displaying multiple previews (resizing if desired) side-by-side, displaying them in a 3-D isometric view of a stack (resembling a stack of papers), and displaying them sequentially with automatic or manual navigation.

The preview of multiple selected files (e.g., selected by clicking a mouse cursor on multiple files, holding the SHIFT or CTRL keys and clicking, or clicking and dragging a selection area around multiple files) can also vary depending on the type of files chosen, and different preview sequences may be used for different combinations of selected files. For example the system (e.g., via the operating system, hardware, an application, etc.) may use a stacked presentation when multiple image files are selected, and use a sequential video preview when multiple video files are selected. The system may also scale back or simplify the previews offered when multiple files are selected, in order to conserve resources.

The various features above may be implemented as a single integrated piece of code, or as a collection of subroutines or modules. For example, there may be an iterator module to handle the preview of multiple files, a commands module that is responsible for the user interface commands offered in the previews, a preview module for generating the preview itself, a properties module for handling the properties/metadata portion of the preview display, etc.

As noted above, these preview features may be offered anytime a user is to be shown a listing of files or other data on the system. When the particular listing is generated through the use of one or more criteria, such as when the display is the result of a user-requested keyword search, the previewer may use the search criteria to assemble the preview. For example, an application may wish to notify the previewer of the keywords used in a search, so that the previewer can determine which preview to use, or how to sequence the previews when multiple previews are to be used. This may be an extensible feature, where the previewer is provided with the search criteria.

Figure 23:
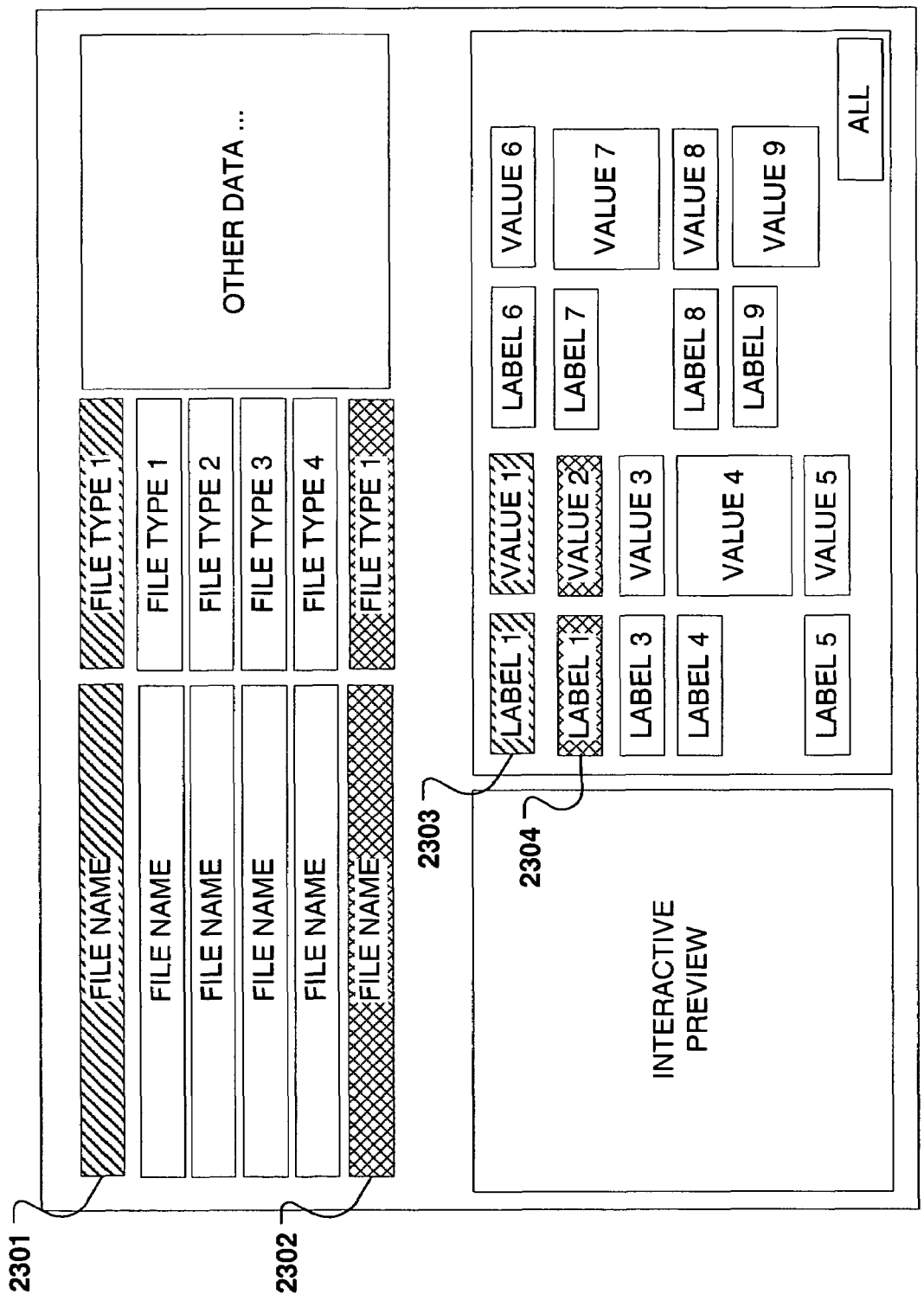
FIG. 23 depicts an example browser having multiple files selected, and visual differentiation of corresponding properties and files.

As noted above, multiple selections may be made, and the displayed preview image may change as a result. These multiple selections may also cause a change in the display of properties and/or metadata. For example, FIG. 23 shows an example view in which two files 2301 and 2302 have been selected. The selected files may be differentiated and/or accentuated in a unique fashion or with a unique appearance, such as having a distinct color, font, shape, texture, style, size, background color, pattern, etc. The properties and metadata for the selected files may display the same property for both files (such as the project name for each) 2303, 2304, and may have a corresponding appearance so that the user can easily match properties with their corresponding files. For example, the properties may be color-coded to identify the selected file to which they belong. The pattern shown for file 2301 may accentuate and/or differentiate the file, such as by a color (e.g., red), a highlighting (e.g., a different color surrounding the text, as with a highlighter on a paper document), a font (e.g., bolding, underlining, ALL CAPS, Times New Roman, etc.), a size (e.g., larger text), etc. Property 2303, which may display a property of file 2301, may have the same accentuation and/or differentiation used for that file, to correlate the properties and their respective files.

Figure 24:
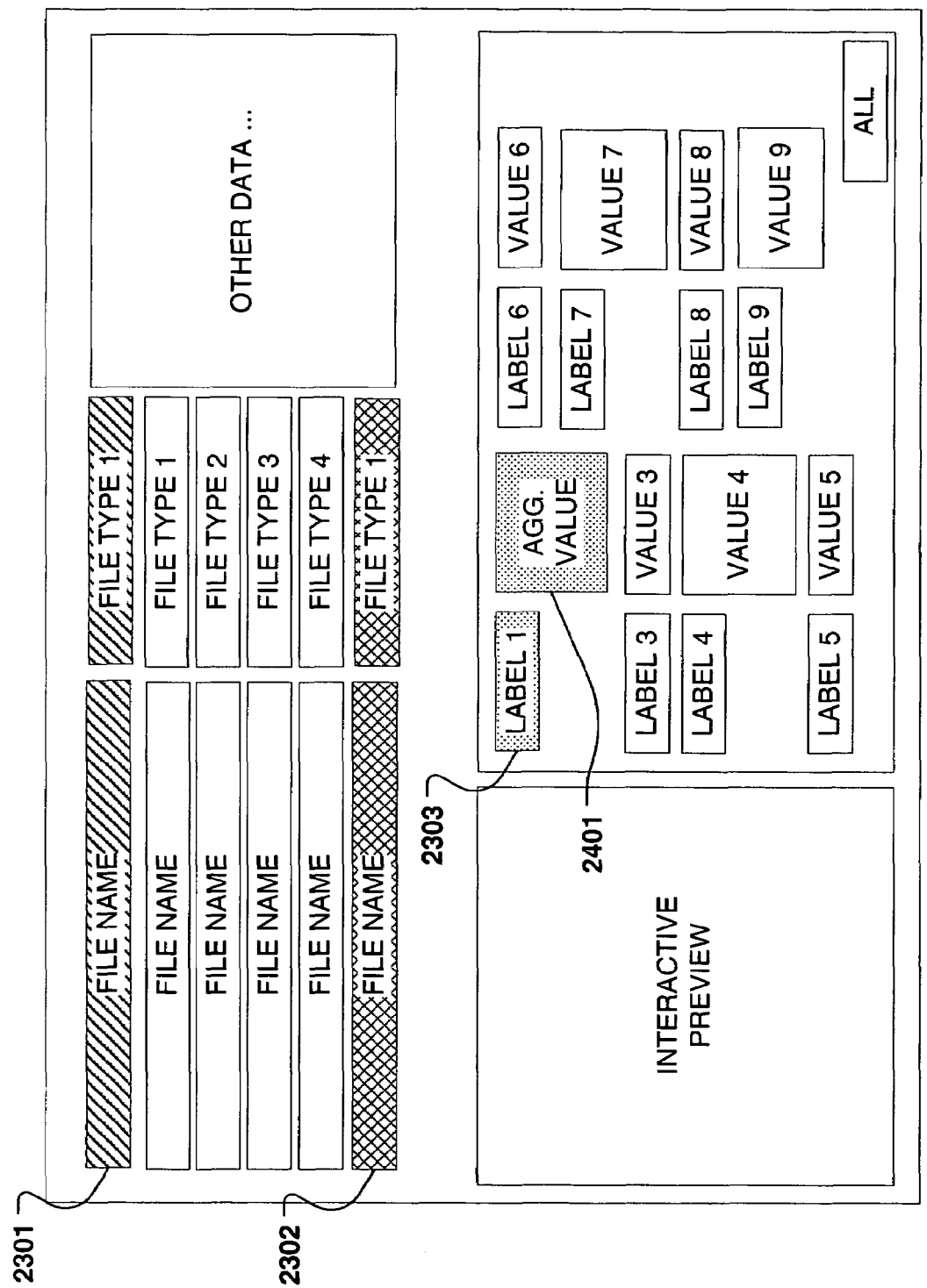
FIG. 24 depicts an example browser having multiple files selected, and an aggregated property field.

Many properties and/or metadata for multiple selected files may be aggregated and presented together as a compilation or sum. For example, if one displayed property is file size (e.g., how many kilobytes (kb) or megabytes (Mb) used), and multiple files are selected, the file size property may display an aggregated file size value, totaling the file sizes of the selected files (e.g., 4.3 Mb). As another example, if one displayed property has keywords, the keywords for multiple selected files may be aggregated together and presented as a single keyword property. Some aggregations may result in a larger property display, and may use the same appearance accentuation/differentiation described above to correlate aggregated properties with their corresponding files. Alternatively, the properties may be further differentiated from the selected files (e.g., a different color, font, highlighting, appearance, size, etc.) to indicate that the property is an aggregation of all selected files. FIG. 24 depicts an example in which an aggregated property value 2401 is displayed with a distinct appearance represented by shading, which is different from the patterns on the selected files 2301, 2302 individually. The shading may represent, for example, the color red, while the patterns on files 2301 and 2302 may be green and yellow.

Figure 25:
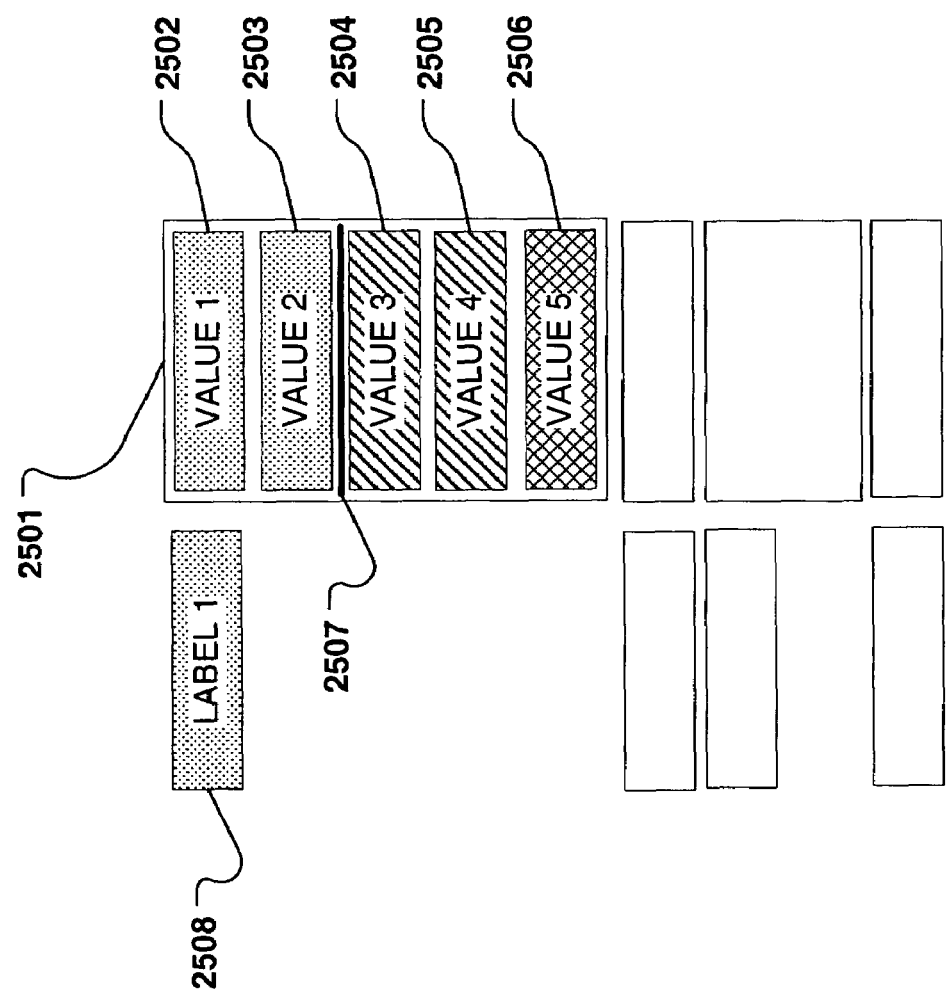
FIG. 25 depicts an example of an aggregated property field, with visual differentiation to correlate properties with one or more selected files.

The accentuation and/or differentiation of the aggregated values may, in some cases, be done in a manner to indicate the source of the values. For example, FIG. 25 depicts an enlarged properties/metadata display of the view shown in FIG. 24. Some aggregated properties, such as keywords, may result in a listing 2501 of multiple property values aggregated from the multiple selections. These aggregated properties may be given distinct appearances that indicate which values came from which selected file. In the FIG. 25 example, values 2502 and 2503 are shown in one form of shading to indicate that those particular values (e.g., keywords) are common to both selected files 2301 and 2302. That shading can reflect any of the types of differentiation and/or accentuation described above (e.g., the color red). Values 2504 and 2505 are shown with a first pattern to indicate that they are associated with one selected file 2301, which shares the same pattern (e.g., a file and its values are both blue) and value 2506 has a different pattern to indicate that it is associated with the other selected file 2302, which shares the same pattern (e.g., this file and its values are green). A separation line 2507 may be used to delineate values that were common to all selected files from those that were not. Of course, different appearances may be given different meanings when more files are selected. Label 2508 may also be visually differentiated and/or accentuated to indicate that it is an aggregated property. For example, label 2508 may also be in red.

Accentuation and/or differentiation can also begin with user selections of certain values in the aggregated values. For example, a user may select one of the values in the aggregated list, and cause a subsequent display to appear that indicates which files share the selected value. The indication could come in the form of a common appearance, where the selected value and its corresponding files are displayed in a common manner. For example, by clicking on value 2506, the system may automatically change the font of that property value to a boldfaced font, and may do the same to the file listing 2302 to identify the file whose property was selected.

Although the discussion above addresses properties and metadata displayed with the previews in a shell browser, these features may be used in other contexts as well. Any situation involving the display of multiple properties and/or metadata may benefit from the features described herein.

While some kinds of properties are easier to aggregate because they have numbers (e.g., file size is simply a total of the individual sizes), other types of properties may be more difficult to aggregate. For example, some properties have text words as values (e.g., keywords). Furthermore, some individual properties and/or metadata may have multiple values themselves, known as multi-value properties. For example, a given file's "keywords" property may have none, one, two, three, or any number of distinct keywords as values (e.g., one file may list "peanut", "food" and "candy" as keywords relating to the file). These multiple values may also be sequenced in a meaningful way for each file, such that the first value listed may be more important (e.g., an article that primarily deals with peanuts, might list "peanut" as the first keyword because it is most important, and may list "food" and "candy" second and third, in descending order of importance). When multiple files, each having multiple keywords, are selected, the process of aggregating those properties is not as simple as just adding numbers. When that occurs, the system may display a listing of the values that are in some form of ranked order based on the order in which they appeared for the individual selected files. Steps may be taken to help ensure that the resulting list of aggregated values corresponds to the relative importance of the values as they appeared for the various selected files. For example, five newspaper articles may have keywords identifying the cities that are discussed in the articles, and ranked in the following order:

File 1: Austin, Chicago, Boston, Detroit
File 2: Chicago, Detroit, Boston
File 3: Chicago, Boston
File 4: Detroit, Chicago
File 5: Boston, Austin In this example, Chicago was given "first place" twice (e.g., Files 2 and 3 discuss Chicago a lot) and "second place" twice" (e.g., Files 1 and 4 don't focus on Chicago, but they do mention it). The resulting aggregation of these properties may remove redundancies, and may display the properties in a sequence that represents the relative importance of "Chicago" (and the other values) to the files, and also take into account the number of times a particular value appeared at all in the files' properties: "Chicago, Boston, Detroit, Austin." So with this example, the multiple selected files, as a whole, deal mostly with Chicago, and then with Boston, and then Detroit, and least with Austin.

Figure 26A:
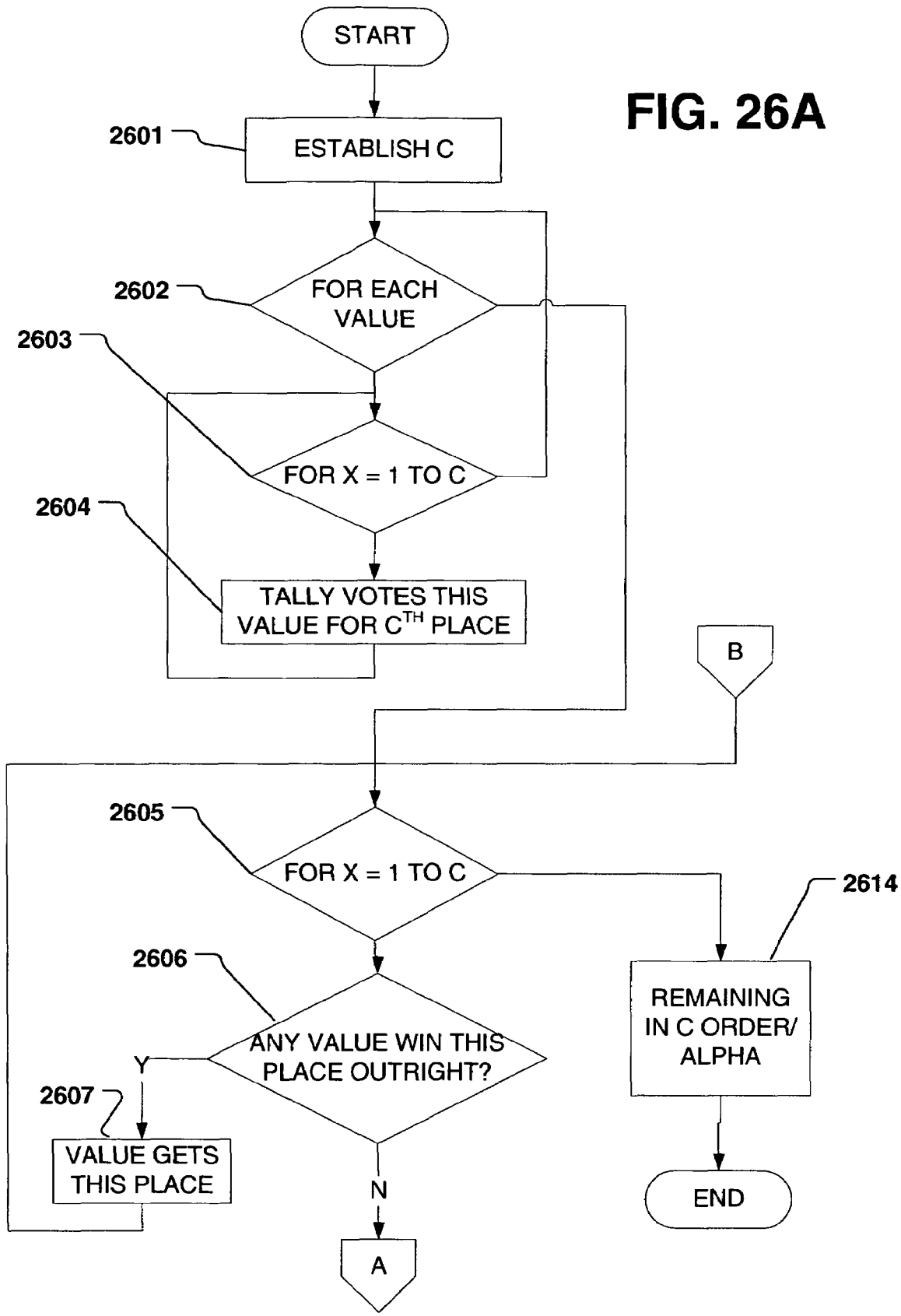
FIGS. 26A–B depict an example process by which several selected multi-value properties may have their values aggregated.
Figure 26B:
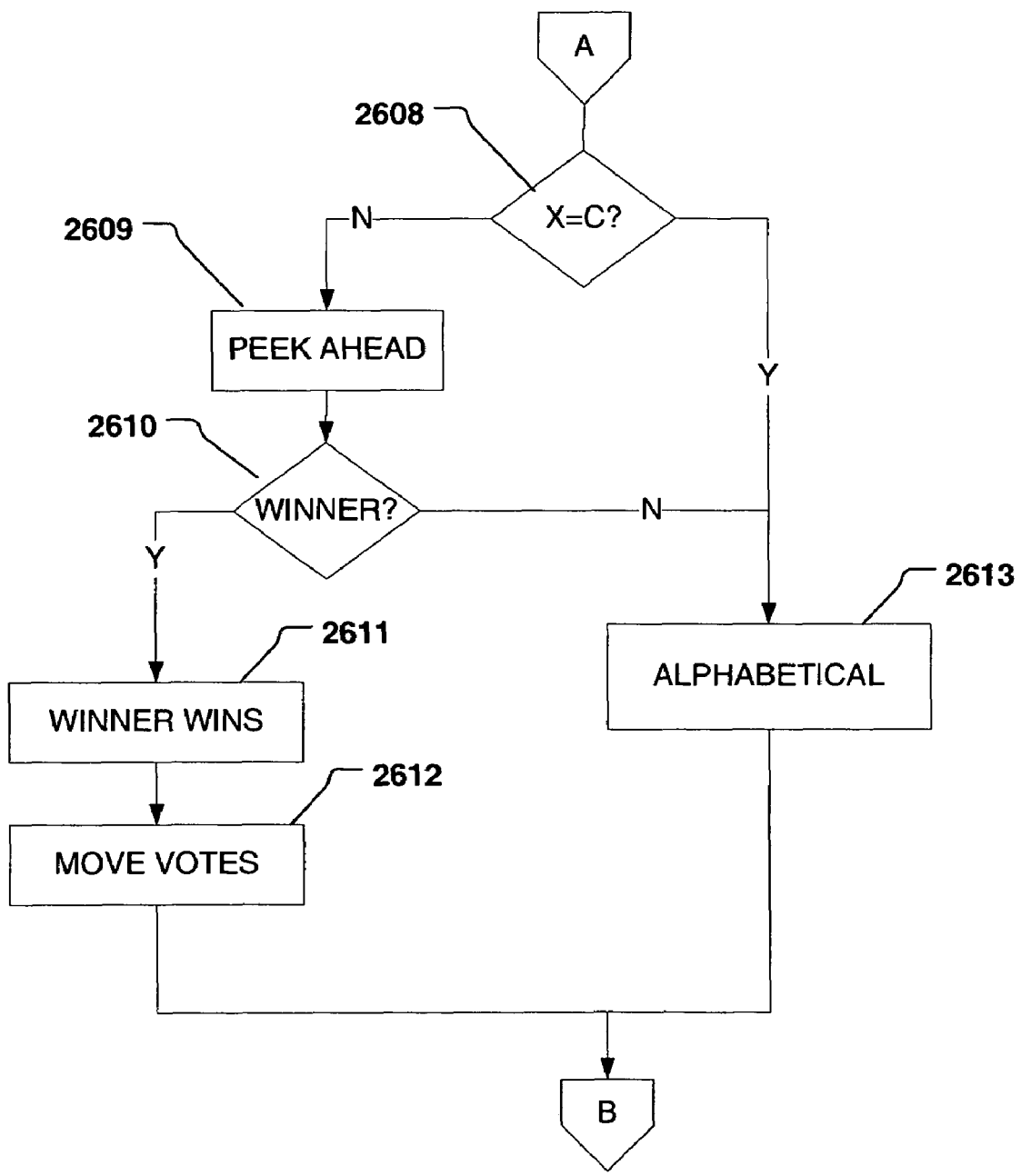

FIGS. 26A–B depict an example process for determining the order in which aggregated values for multiple-value properties may be displayed, and may be run whenever such an aggregated display is needed, and/or whenever a multi-value property is changed. The process is a modified form of the Single Transferable Vote algorithm. In this process, when a particular value is listed first in a file's properties, that is considered a "vote" for first place. If the value is listed second, that's a vote for second place, and so on, and so forth. The process produces a nonredundant ranking that is based on both the number of times each particular value appears in the selected files, and on the relative importance placed on the value by each of the selected files.

In step 2601, a global integer constant, C, is established either automatically (e.g., the computer system may detect the availability of system resources, and adjust the constant to avoid bogging down the system), or manually (e.g., the user may be given the option to set C as high or as low as they want, depending on how much detail they want in the aggregation of multi-value properties). This constant represents a number of places or rankings for which the process will be carried out, for example, C may be ten (10). A higher constant C will allow greater granularity in the ranking, but would require greater processing power and more time. This value may be dynamically established depending on user preference, system settings, available resources, system load, etc.

In step 2602, a loop begins for each value present among the selected files. In step 2603, a nested loop is executed for the first C places in the voting. In step 2604, for each place, the system tallies the number of votes that the current value received for that place. These two loops result in the system determining, for each value, how many "votes" it Received for each of the first C "places." Then, in step 2605, another loop is begun to process each of the C places, beginning with the top place (first place) and proceeding on through the Cth place.

In step 2606, a check is made to determine whether any single value received the most votes for the place under consideration. If a value received the most votes for this place, that value is awarded this place, and the value is removed from the remainder of the calculations in the vote tabulation process, in step 2607. So in the above example, Chicago received the most votes for first place (two votes).

If, in step 2606, no single value had the most votes for this place, then there is a tie for the current place (either 2 or more values had the same number of votes for this place, or all values had zero votes for this place), and the process moves to step 2608 where a check is made to determine whether the current place being checked is the last place to be checked (Cth place). If it is not, the process moves to step 2609. In step 2609, the system "peeks" ahead one place, to identify the number of votes that the current tied values received for the next place. In step 2610, if one of the tied values had the most votes for the next place, then that value is given the present place in step 2611, and the votes for the current place held by the other tied values are moved, or transferred, to the next place. In other words, the "losers" at step 2611 have their votes for the current place added to their vote total for the next place, so that for every value that received votes in the place under consideration, but was not awarded that place, its votes in the current round are carried over and added to its votes in the next round when computing a winner for that round.

If, in step 2610, none of the tied values has the most votes for the next place, then all of the tied values are ranked in alphabetical order for the current place in step 2613 (and the next several places until the tied values are all given a place), and the process returns to step 2605. Similarly, if, in step 2608, the process happened to be examining the last place (place C) when the tie occurred, then the process also moves to step 2613 to rank the tied values alphabetically, and on to step 2605.

From step 2605, if the last place (Cth place) has been processed, then the process moves to step 2614, where all remaining votes for the remaining unranked values are treated as votes for Cth place, and the remaining values are ranked in order of whomever has the most votes for Cth place, with ties being broken using alphabetical order.

The algorithm shown in FIGS. 26A–B may keep a summary table in memory tabulating the various vote counts and values. The table may be advantageous, in that the system can incrementally load the table into operating RAM as the process runs, deleting portions from RAM that are not longer needed, and thereby reducing the amount of run-time memory required to run the process.

In some instances, the various multi-property values may undergo a normalization process. The normalization process may delete redundant appearances of values in a file's multi-property field. For example, a file may have keywords (Dog, Cat, Dog), and the normalization process may keep the first occurrence of the values, and remove subsequent occurrences of the same value (e.g., resulting in "Dog, Cat"). Un-normalized data may be stored in the system's memory, and the normalized version may overwrite that data, or the normalization data may simply be stored separately in the memory. In some instances, normalization may occur when the user modifies a multi-value property.

In some instances, a user may wish to edit the multi-value properties through interaction with the aggregated display. When that occurs, the system may revise the multi-value properties for each file in response to changes made to the aggregated multi-value properties display. For example, an addition of a new property to the end of the aggregated display may simply cause the new property to be appended to the multi-value property for each of the files. The same thing may occur if a new property is inserted in the beginning of the aggregated multi-value property display, or any other insertion. Some changes, such as reordering of the properties within the aggregated properties display, may cause a corresponding reordering of the multi-value properties for each of the files.

Figure 27:
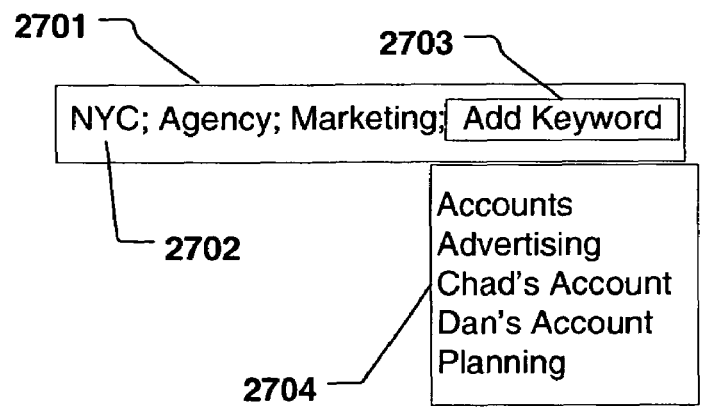
FIG. 27 depicts an example of a multi-value property field.

Multi-value properties may also have a unique approach to editing data. For example, fields for such properties may appear in a list, similar to that shown in FIG. 27. Field 2701 may be an active text edit box in which the user may type to enter data, and may have a number of values 2702, which may be delineated in the field by characters such as semicolons. Values 2702 may exhibit atomic behavior, or token behavior, such that the entire value may be selected as a single selection. Thus, in some instances, when an insertion point is placed in the field 2701 to edit data, an atomic value 2702 may behave as a single unit, as opposed to a plurality of characters (e.g., "NYC", as opposed to "N" "Y" "C"), and placing an insertion point within an atomic value might even be prohibited, such that an attempt to place an insertion point within the atomic value (e.g., by clicking a mouse within it) may result in an insertion point being placed before or after the atomic value. Pressing arrow keys to navigate around an atomic value may also move from one side of the value to the other side in a single keypress. Furthermore, when selection regions are possible, such regions may be prohibited from selecting only a part of an atomic value, such that selection of a predetermined portion (e.g., half) of the value results in a selection of the entire value. Hovering over an atomic value may cause the value to enter a hover state indicating that it is an atomic value. For example, the hover state may include a box or highlighting, or other visual differentiation or accentuation around the entire atomic value. With the atomic values, the values may also be rearranged by drag-and-drop operation.

The token behavior is not limited to simply selecting the entire word at once. The word may be replaced by alternative user interface elements. For example, a time could be replaced by a graphic image of a clock; a date could be replaced by an image of a calendar. The atomic values may exhibit icon behavior, such that clicking (or right-clicking) on them may cause additional levels of interactivity, such as bringing up command menus, option lists, other pop-ups, etc. Values can also be dragged onto other files and/or properties, and those values may be added to the other files and/or properties.

At the end of the field's list, there may be a prompt string 2703 reminding the user of what data the field contains. In some instances, the prompt string 2703 may appear only when the field 2701 is in an edit state, such as when it is given a keyboard focus for the entry of data, and the prompt string 2703 is not treated as an actual value in the multi-value field (e.g., it is not saved to memory as a value in the field, but is rather generated as part of the user interface).

The prompt string 2703 may have be visually differentiated and/or accentuated using any of the types previously discussed (e.g, it may have a highlighting of a certain color in the area around the letters), and may exhibit some types of default behavior. For example, the prompt string 2703 may automatically appear whenever the field 2701 is in an edit state and an insertion point is at the end of the string of values. Once the user starts typing to insert a new value at the insertion point (e.g., by starting to type in a textbox), and new characters are added, the prompt string 2703 may automatically disappear. The prompt string may reappear automatically should the user complete, or abort, entry of the new value.

Figure 28:
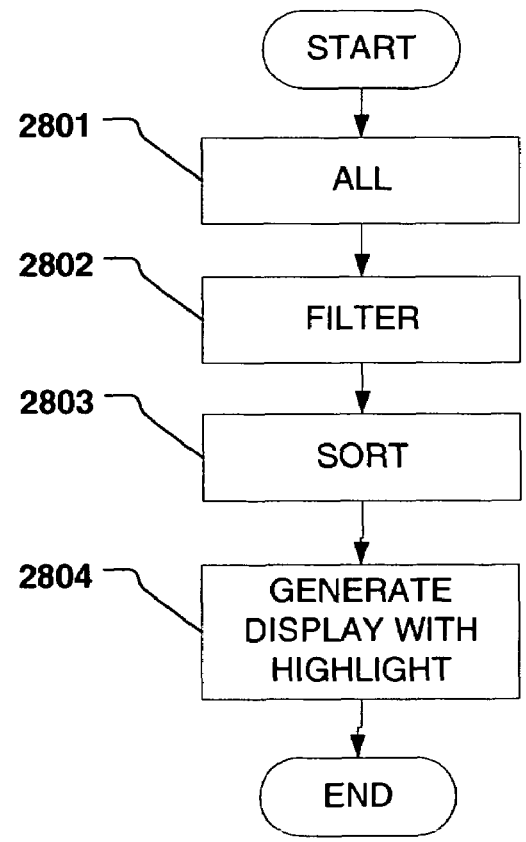
FIG. 28 depicts an example process for an autoselect feature.

In the edit state, the field may also display a dropdown menu 2704 providing the user with a list of potential values to add to the multi-value field 2701, and the user can select an entry from the menu. The dropdown menu 2704 may include an autosuggest feature, which may be implemented according to the process shown in FIG. 28. First, the process may begin in step 2801 by collecting all values already in use for the given property and/or used by the given user. In step 2802, the menu 2704 can omit values that are already present in the multi-value property for the selected file(s), since the user is unlikely to want to add a duplicate. In step 2803, the list may be sorted by popularity, alphabetically, or by any other desired method. Then, in step 2804, the menu may be displayed with the autosuggest. If some of the listed values are already present for some, but not all, of the selected files, those values may be given a different appearance (e.g., highlighting, coloring, pattern, font, etc. as discussed above) to indicate that fact. Values that are not used in any of the selected files may also be given a different appearance to indicate that fact.

Figure 29:
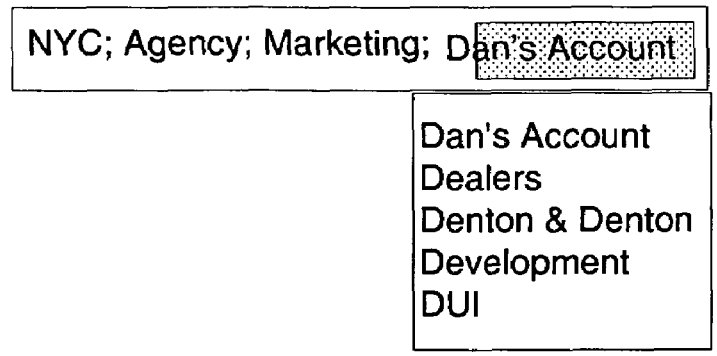
FIG. 29 depicts an example of a multi-value property field with the autocomplete feature.
Figure 30:
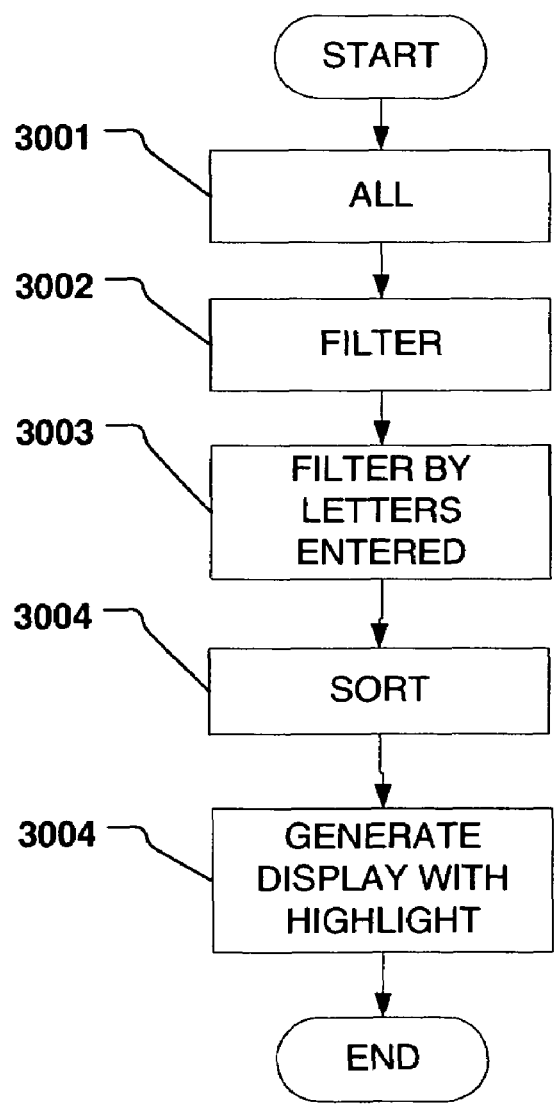
FIG. 30 depicts an example process for an autocomplete feature.

The field may also have an autocomplete feature, as shown in FIG. 29. With the autocomplete feature, when a user begins to type a new value to add to the multi-value property (such as by typing the "D" in the FIG. 29 example), the system may automatically attempt to complete the entry with an anticipated value. The autocomplete feature may be implemented using the process shown in FIG. 30. The anticipated value may be selected by first taking all of the values in use for the given property in step 3001, and filtering out the ones that already apply to the selected file(s) in step 3002. A further filtering may occur in step 3003 to identify the values that begin with the letters that have already been entered by the user, and selecting the first (alphabetically) value that starts with the letter(s) that the user has already typed. In step 3004, the remaining possibilities may be sorted by popularity, alphabetically, or by any other desired method, and in step 3004 the remaining list may be displayed. The first entry in the list may be selected by default, and may be highlighted and the remaining characters may automatically be placed in the field following the user's entered data, with additional highlighting if desired.

The autosuggest and autocomplete features described above may include other types of filtering steps as well. For example, filters may select the most recent values that were selected and/or entered by the user; or filter the possible values based on the context that created the listing of properties. For example, if the selected files were selected for display as part of a project view (e.g., displaying files that relate to a given project), the system may automatically determine that certain possible values are more (or less) likely to be used in that project, and may filter the list accordingly.

When the user is entering data in the field, a check may be made to validate the entry. For example, certain fields may be predetermined to only have a specified range or list of possible values (e.g., day of week), and if the user attempts to enter an invalid entry in the multi-property field, the system may simply reject the entry, providing the user with a message indicating that the entry was invalid.

Alternative embodiments and implementations of the present invention will become apparent to those skilled in the art to which it pertains upon review of the specification, including the drawing figures. For example, the various steps in the described processes may be rearranged, modified, and/or deleted as desired to implement a selected subset of features described herein. Additionally, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

What is claimed is:

1. A method of displaying file properties, comprising the steps of:
   receiving a user selection of multiple files of a computer system from a graphical browser, said files each having at least one value for a common multi-value property; and
   displaying, in a metadata area on a display of said computer system, an aggregation of values of said common multi-value property of said selected multiple files, wherein said aggregation of values displays values of at least two of the selected files, and wherein one or more values that correlate to only a subset of said selected files are visually differentiated from values that correlate to all of said selected files.

2. The method of claim 1, wherein a second displayed value is visually differentiated to indicate that said second displayed value is associated with all of said selected files.

3. The method of claim 1, further comprising the step of visually differentiating said one or more of said selected files in a manner corresponding to said at least one displayed value.

4. The method of claim 1, further comprising the step of normalizing said multi-value property values of said selected multiple files.

5. The method of claim 1, the displaying further comprising the step of arranging said aggregation of values based on priorities given by said multiple files.

6. The method of claim 5, wherein said step of arranging includes the steps of:
   establishing an integer constant C; and
   tallying priority votes for each value found in the multi-value property of said selected files for places 1 through C.

7. The method of claim 6, wherein said step of arranging further includes the step of, for one of the places 1 through C, assigning a value having the most priority votes to that place.

8. The method of claim 7, wherein said step of arranging further includes the step of peeking, in the event of a tie between two or more values for said one of the places 1 through C, ahead to the next sequential place after said one of the places 1 through C, and awarding said one of the places 1 through C based on the results of said peeking.

9. The method of claim 1, farther comprising the step of displaying a prompt text string among said displayed aggregation of values in a metadata area of said display.

10. The method of claim 9, farther comprising the step of automatically removing said prompt text string in response to a user initiating a data entry operation in said displayed aggregated values.

11. The method of claim 10, farther comprising the step of automatically replacing said prompt text string in response to said user terminating said data entry operation.

12. The method of claim 1, farther comprising the step of 1, further comprising the step of displaying a dropdown menu of suggestions in response to a user initiating a data entry operation in said displayed aggregated values.

13. The method of claim 12, wherein said menu of suggestions is automatically filtered based on contextual criteria.

14. The method of claim 13, farther comprising the step of sorting said filtered menu of suggestions.

15. A method of displaying data, comprising the steps of:
   displaying, on a computer system display, a list of files to a user;
   receiving user selection of a plurality of said files;
   displaying a preview of one or more of said files;
   displaying metadata of said selected files while said preview is displayed, wherein at least a portion of said metadata is displayed in a metadata area of said display and includes an aggregation of values of a multi-value property of at least two of said selected plurality of files;
   while said metadata is displayed, visually differentiating a first subset of said aggregated values to identify one or more associations between said first subset of values and a first subset of said selected files; and
   while said metadata is displayed, visually differentiating a second subset of said aggregated values to identify one or more associations between said second subset of values and a second subset of said selected files.

16. The method of claim 15, wherein said aggregated values are displayed in a field, and said field appends prompt text to an end of said aggregated values.

17. The method of claim 16, further comprising the step of automatically removing said prompt text in response to user initiation of a data entry operation in said field.

18. The method of claim 17, further comprising the step of arranging said displayed aggregated values in accordance with respective priorities associated with each of said selected files.

19. A method of editing file metadata, comprising the steps of:
   displaying, in a metadata area of a display, two or more values for a first property from a plurality of user selected files, wherein first and second ones of said selected files have different displayed values for said first property;
   visually differentiating those of said displayed values that correlate to a subset of said user selected files from those of said displayed values that correlate to all of said user selected files;
   revising said displayed values inaccordance with a user request to edit said values in said metadata area; and
   making a corresponding revision to properties of each of said selected files in response to said user editing said displayed values.

\* \* \* \* \*